(12) United States Patent
Gu et al.

(10) Patent No.: US 12,498,590 B2
(45) Date of Patent: *Dec. 16, 2025

(54) USING PARTICLES FOR LIGHT FILTERING

(71) Applicant: Johnson & Johnson Vision Care, Inc., Jacksonville, FL (US)

(72) Inventors: Frank Gu, Toronto (CA); Aaron Joshua Clasky, Toronto (CA); Paul Chen, Toronto (CA)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 697 days.

This patent is subject to a terminal disclaimer.

(21) Appl. No.: 17/661,112

(22) Filed: Apr. 28, 2022

(65) Prior Publication Data

US 2023/0350230 A1 Nov. 2, 2023

(51) Int. Cl.
| | | |
|---|---|---|
| *G02C 7/04* | (2006.01) | |
| *C08K 3/08* | (2006.01) | |
| *C08K 5/12* | (2006.01) | |
| *C08K 9/08* | (2006.01) | |
| *B82Y 30/00* | (2011.01) | |
| *B82Y 40/00* | (2011.01) | |
| *G02C 7/10* | (2006.01) | |

(52) U.S. Cl.
CPC ............. *G02C 7/049* (2013.01); *C08K 3/08* (2013.01); *C08K 5/12* (2013.01); *C08K 9/08* (2013.01); *B82Y 30/00* (2013.01); *B82Y 40/00* (2013.01); *C08K 2003/0831* (2013.01); *C08K 2201/011* (2013.01); *G02C 7/104* (2013.01)

(58) Field of Classification Search
CPC .......... G02C 7/049; G02C 7/104; C08K 3/08; C08K 5/12; C08K 9/08
See application file for complete search history.

(56) References Cited

U.S. PATENT DOCUMENTS

| | | |
|---|---|---|
| 3,808,178 A | 4/1974 | Gaylord |
| 4,120,570 A | 10/1978 | Gaylord |
| (Continued) | | |

FOREIGN PATENT DOCUMENTS

| | | |
|---|---|---|
| EP | 0080539 B1 | 6/1983 |
| EP | 2165791 A2 | 3/2010 |
| (Continued) | | |

OTHER PUBLICATIONS

Ahmed E. Salih, Mohamed Elsherif, Fahad Alam, Ali K. Yetisen, and Haider Butt, Gold Nanocomposite Contact Lenses for Color Blindness Management, ACS Nano 2021 15 (3), 4870-4880. (Year: 2021).*

(Continued)

*Primary Examiner* — Bijan Ahvazi
(74) *Attorney, Agent, or Firm* — Raef M. Shaltout

(57) ABSTRACT

A composition for light filtering, the composition comprising: a base material comprising a HEMA-based material; a plurality of metal nanoparticles dispersed in the base material, wherein the plurality of metal nanoparticles exhibit a peak light absorption value in the range of about 500 nm to about 600 nm; an anchoring mechanism dispersed in the base material, the anchoring mechanism comprising methacryloyl-derived monomer; and a nanoparticle coating material disposed on at least a portion of the plurality of metal nanoparticles.

25 Claims, 7 Drawing Sheets

(56) References Cited

U.S. PATENT DOCUMENTS

| | | |
|---|---|---|
| 4,136,250 A | 1/1979 | Mueller et al. |
| 4,153,641 A | 5/1979 | Deichert et al. |
| 4,436,887 A | 3/1984 | Chromecek et al. |
| 4,495,313 A | 1/1985 | Larsen |
| 4,659,782 A | 4/1987 | Spinelli |
| 4,659,783 A | 4/1987 | Spinelli |
| 4,740,533 A | 4/1988 | Su et al. |
| 4,889,664 A | 12/1989 | Kindt-Larsen et al. |
| 5,006,622 A | 4/1991 | Kunzler et al. |
| 5,034,461 A | 7/1991 | Lai et al. |
| 5,039,459 A | 8/1991 | Kindt-Larsen et al. |
| 5,070,215 A | 12/1991 | Bambury et al. |
| 5,236,969 A | 8/1993 | Kunzler et al. |
| 5,244,981 A | 9/1993 | Seidner et al. |
| 5,270,418 A | 12/1993 | Kunzler et al. |
| 5,298,533 A | 3/1994 | Nandu et al. |
| 5,314,960 A | 5/1994 | Spinelli et al. |
| 5,331,067 A | 7/1994 | Seidner et al. |
| 5,371,147 A | 12/1994 | Spinelli et al. |
| 5,760,100 A | 6/1998 | Nicolson et al. |
| 5,776,999 A | 7/1998 | Nicolson et al. |
| 5,789,461 A | 8/1998 | Nicolson et al. |
| 5,824,719 A | 10/1998 | Kunzler et al. |
| 5,849,811 A | 12/1998 | Nicolson et al. |
| 5,962,548 A | 10/1999 | Vanderlaan et al. |
| 5,965,631 A | 10/1999 | Nicolson et al. |
| 5,998,498 A | 12/1999 | Vanderlaan et al. |
| 6,087,415 A | 7/2000 | Vanderlaan et al. |
| 6,367,929 B1 | 4/2002 | Maiden et al. |
| 6,420,453 B1 | 7/2002 | Bowers et al. |
| 6,423,761 B1 | 7/2002 | Bowers et al. |
| 6,767,979 B1 | 7/2004 | Muir et al. |
| 6,822,016 B2 | 11/2004 | McCabe et al. |
| 6,867,245 B2 | 3/2005 | Iwata et al. |
| 6,943,203 B2 | 9/2005 | Vanderlaan et al. |
| 6,951,894 B1 | 10/2005 | Nicolson et al. |
| 7,052,131 B2 | 5/2006 | McCabe et al. |
| 7,247,692 B2 | 7/2007 | Laredo |
| 7,249,848 B2 | 7/2007 | Laredo et al. |
| 7,396,890 B2 | 7/2008 | Zanini et al. |
| 7,461,937 B2 | 12/2008 | STeffen et al. |
| 7,468,398 B2 | 12/2008 | Nicolson et al. |
| 7,538,146 B2 | 5/2009 | Nicolson et al. |
| 7,553,880 B2 | 6/2009 | Nicolson et al. |
| 7,572,841 B2 | 8/2009 | Chen et al. |
| 7,666,921 B2 | 2/2010 | McCabe et al. |
| 7,691,916 B2 | 4/2010 | McCabe et al. |
| 7,786,185 B2 | 8/2010 | Rathore et al. |
| 7,825,170 B2 | 11/2010 | Steffen et al. |
| 7,915,323 B2 | 3/2011 | Awasthi et al. |
| 7,934,830 B2 | 5/2011 | Blackwell et al. |
| 7,956,131 B2 | 6/2011 | Arnold et al. |
| 7,994,356 B2 | 8/2011 | Awasthi et al. |
| 8,022,158 B2 | 9/2011 | Rathore et al. |
| 8,138,290 B2 | 3/2012 | Blackwell et al. |
| 8,163,206 B2 | 4/2012 | Chang et al. |
| 8,273,802 B2 | 9/2012 | Laredo et al. |
| 8,389,597 B2 | 3/2013 | Blackwell et al. |
| 8,399,538 B2 | 3/2013 | Steffen et al. |
| 8,415,404 B2 | 4/2013 | Nicolson et al. |
| 8,420,711 B2 | 4/2013 | Awasthi et al. |
| 8,450,387 B2 | 5/2013 | McCabe et al. |
| 8,470,906 B2 | 6/2013 | Rathore et al. |
| 8,487,058 B2 | 7/2013 | Liu et al. |
| 8,507,577 B2 | 8/2013 | Zanini et al. |
| 8,568,626 B2 | 10/2013 | Nicolson et al. |
| 8,637,621 B2 | 1/2014 | Iwata et al. |
| 8,703,891 B2 | 4/2014 | Broad |
| 8,937,110 B2 | 1/2015 | Alli et al. |
| 8,937,111 B2 | 1/2015 | Alli et al. |
| 8,940,812 B2 | 1/2015 | Reboul et al. |
| 8,980,972 B2 | 3/2015 | Driver |
| 9,005,890 B1 | 4/2015 | Bhethanabotla et al. |
| 9,056,878 B2 | 6/2015 | Fujisawa et al. |
| 9,057,821 B2 | 6/2015 | Broad et al. |
| 9,125,808 B2 | 9/2015 | Alli et al. |
| 9,140,825 B2 | 9/2015 | Alli et al. |
| 9,156,934 B2 | 10/2015 | Alli et al. |
| 9,170,349 B2 | 10/2015 | Mahadevan et al. |
| 9,217,813 B2 | 12/2015 | Liu et al. |
| 9,244,196 B2 | 1/2016 | Scales et al. |
| 9,244,197 B2 | 1/2016 | Alli et al. |
| 9,260,544 B2 | 2/2016 | Rathore et al. |
| 9,297,928 B2 | 3/2016 | Molock et al. |
| 9,297,929 B2 | 3/2016 | Scales et al. |
| 10,054,803 B2 | 8/2018 | Wold et al. |
| 10,935,814 B2 * | 3/2021 | Valentine ............... G02B 5/285 |
| 11,733,440 B1 * | 8/2023 | Gu .......................... C08L 39/06 |
| | | 252/586 |
| 11,971,518 B2 * | 4/2024 | Gu ......................... G02C 7/108 |
| 2006/0275596 A1 | 12/2006 | Payne et al. |
| 2007/0298242 A1 | 12/2007 | Huo |
| 2008/0020127 A1 | 1/2008 | Whiteford et al. |
| 2008/0203592 A1 | 8/2008 | Qiu et al. |
| 2009/0130773 A1 | 5/2009 | Ayi et al. |
| 2010/0048847 A1 | 2/2010 | Broad |
| 2013/0235335 A1 * | 9/2013 | Forrest ................... G02C 7/108 |
| | | 351/159.73 |
| 2013/0329272 A1 | 12/2013 | Matsumura et al. |
| 2017/0079909 A1 | 3/2017 | Zhang et al. |
| 2018/0037690 A1 | 2/2018 | Aitken et al. |
| 2018/0338912 A1 | 11/2018 | Doshi |
| 2019/0187140 A1 | 6/2019 | Kamei et al. |
| 2020/0004051 A1 * | 1/2020 | Wada ........................ G02C 7/10 |
| 2021/0003754 A1 | 1/2021 | Gu et al. |
| 2021/0309913 A1 | 10/2021 | Harding |
| 2021/0389731 A1 * | 12/2021 | Gu ......................... G01N 31/229 |
| 2022/0187628 A1 * | 6/2022 | Valentine .................. C09B 5/00 |
| 2023/0348717 A1 | 11/2023 | Gu et al. |
| 2023/0348718 A1 | 11/2023 | Gu et al. |
| 2023/0350099 A1 | 11/2023 | Gu et al. |

FOREIGN PATENT DOCUMENTS

| | | |
|---|---|---|
| JP | 2006070300 A | 3/2006 |
| WO | 2003022321 A2 | 3/2003 |
| WO | 2007133197 A1 | 11/2007 |
| WO | 2008061992 A2 | 5/2008 |
| WO | 2014186901 A1 | 11/2014 |
| WO | 2016100457 A1 | 6/2016 |
| WO | 2020176444 A1 | 9/2020 |

OTHER PUBLICATIONS

Qian Li , Xiaolu Zhuo , Shuang Li , Qifeng Ruan , Qing-Hua Xu , and Jianfang Wang, Production of Monodisperse Gold Nanobipyramids with Number Percentages Approaching 100% and Evaluation of Their Plasmonic Properties, Adv. Optical Mater. 2015, 3, 801-812. (Year: 2015).*

Jose E. Ortiz-Castillo, Roberto C. Gallo-Villanueva, Marc J. Madou, Victor H. Perez-Gonzalez, Anisotropic gold nanoparticles: A survey of recent synthetic methodologies, Coordination Chemistry Reviews 425 (2020) 213489. (Year: 2020).*

Clasky, et al., "Polymer Co-Coating of Gold Nanoparticles Enables Their Integration Into Contact Lenses for Stable, Selective Ocular Light Filters", Advanced Materials Interfaces, Nov. 10, 2022, pp. 1-11, vol. 9 Issue 33.

Itoh et al, Effect of Core-Shell Ceria/Poly(vinylpyrrolidone) (PVP) Nanoparticles Incorporated in Polymer Films and Their Optical Properties, Materials, 2013, pp. 2119-2129, vol. 6.

Koczkur et al, Polyvinylpyrrolidone (PVP) in nanoparticle synthesis, Dalton Trans., 2015, pp. 17883-17905, vol. 44.

Li, et al., "Production of Monodisperse Gold Nanobipyramids with Number Percentages Approaching 100% and Evaluation of Their Plasmonic Properties", Advanced optical materials, Feb. 9, 2015, pp. 801-812, vol. 3 Issue 6.

Ortiz-Castillo, et al., "Anisotropic gold nanoparticles: A survey of recent synthetic methodologies", Coordination chemistry reviews, Sep. 11, 2020, pp. 1-23, vol. 425.

PCT International Search Report, dated Aug. 25, 2023, for PCT Int'l Appln. No. PCT/IB2023/051955.

(56) References Cited

OTHER PUBLICATIONS

PCT International Search Report, dated Aug. 28, 2023, for PCT Int'l Appln. No. PCT/IB2023/051957.
PCT International Search Report, dated Jun. 12, 2023, for PCT Int'l Appln. No. PCT/IB2023/052020.
PCT International Search Report, dated Jun. 7, 2023, for PCT Int'l Appln. No. PCT/IB2023/051959.
PCT International Search Report, dated Sep. 22, 2023, for PCT Int'l Appln. No. PCT/IB2023/052021.
Alkilany et al, Cellular Uptake and Cytotoxicity of Gold Nanorods: Molecular Origin of Cytotoxicity and Surface Effects, Small, Mar. 2009, pp. 701-708, vol. 5, No. 6.
Badawy et al, Contact Lenses for Color Blindness, Advanced Healthcare Materials, 2018, Doc. No. 1800152, pp. 1-7, vol. 7, Issue 12.
Biradar et al, Polydentate disulfides for enhanced stability of AuNPs and facile nanocavity formation, J. Mater. Chem., May 2012, p. 10000, vol. 22, No. 19.
Canpean et al, Enhanced thermal stability of gelatin coated gold nanorods in water solution, Colloids and Surfaces A: Physicochemical and Engineering Aspects, 2013, pp. 9-13, vol. 433.
Chen et al, Enhanced thermal stability of silica-coated gold nanorods for photoacoustic imaging and image-guided therapy, Optics Express, Apr. 26, 2010, pp. 8867-8878, vol. 18, No. 9.
Cho et al, Atomic Scale Mechanisms Underlying Thermal Reshaping of Anisotropic Gold Nanocrystals Revealed by in Situ Electron Microscopy, J. Phys. Chem. C, Jun. 2020, pp. 12855-12863, vol. 124, No. 23.
Clasky et al, From prevention to diagnosis and treatment: Biomedical applications of metal nanoparticle-hydrogel composites, Acta Biomaterialia, 2021, pp. 1-25, vol. 122.
Compendium of Polymer Terminology and Nomenclature: IUPAC Recommendations 2008, edited by: Richard G. Jones, Jaroslav Kahovec, Robert Stepto, Edward S. Wilks, Michael Hess, Tatsuki Kitayama, and W. Val Metanomski.
Crispim et al, Functionalization of poly(vinyl alcohol) by addition of methacryloyl groups: characterization by FTIR and NMR and optimization of reaction conditions by RSM, e-Polymers, 2006, pp. 1-18, No. 062.
Fan et al, Customizable Ligand Exchange for Tailored Surface Property of Noble Metal Nanocrystals, AAAS Research, 2020, pp. 1-12, vol. 2020, Article ID 2131806.
Hakemi-Vala et al, Chapter 13—Nanoemulsions: A Novel Antimicrobial Delivery System, Nano- and Microscale Drug Delivery Systems, Design and Fabrication, 2017, pp. 245-266, ., Elsevier Inc.
Hermanson, ., Bioconjugate Techniques, 2008, pp. vi-1202, Second Edition, Pierce Biotechnology, Thermo Fisher Scientific, Rockford, Illinois.
Horiguchi et al, Photothermal Reshaping of Gold Nanorods Depends on the Passivating Layers of the Nanorod Surfaces, Langmuir, 2008, pp. 12026-12031, vol. 24, No. 20.
Huang et al., Single-crystalline and multiple-twinned gold nanoparticles: An atomistic perspective on structural and thermal stabilities, RSC Adv., Jan. 2014, pp. 7528-7537, vol. 4, No. 15.
Kennedy et al, Thermal Reshaping Dynamics of Gold Nanorods: Influence of Size, Shape, and Local Environment, ACS Appl. Mater. Interfaces, Dec. 2018, pp. 43865-43873, vol. 10, No. 50.
Khalavka et al, Enhanced Thermal Stability of Gold and Silver Nanorods by Thin Surface Layers, Journal of Physical Chemistry C, 2007, pp. 12886-12889, vol. 111, No. 35.
Kou et al, Growth of Gold Bipyramids with Improved Yield and Their Curvature-Directed Oxidation, Small, Dec. 2007, pp. 2103-2113, vol. 3, No. 12.
Kou et al, Growth of Gold Nanorods and Bipyramids Using CTEAB Surfactant, J. Phys. Chem. B. Aug. 2006, pp. 16377-16383, vol. 110, No. 33.
Lingham et al, How does spending time outdoors protect against myopia? A review, Br J Ophthalmol, 2020, pp. 593-599, vol. 104.
Liu et al, Mechanism of Silver(I)-Assisted Growth of Gold Nanorods and Bipyramids, J. Phys. Chem. B, Dec. 2005, pp. 22192-22200, vol. 109, No. 47.
Liu et al, The Effects of Monochromatic Illumination on Early Eye Development in Rhesus Monkeys, Investig. Opthalmology Vis. Sci., Mar. 2014, pp. 1901-1909, vol. 55, No. 3.
Long et al, Illumination with monochromatic long-wavelength light promotes myopic shift and ocular elongation in newborn pigmented guinea pigs, Cutan. Ocul. Toxicol., Dec. 2009, pp. 176-180, vol. 28, No. 4.
Masse et al, Synthesis of Ultrastable Gold Nanoparticles as a New Drug Delivery System, Molecules, 2019, pp. 1-17, vol. 24, No. 2929.
Mohamed et al, Thermal Reshaping of Gold Nanorods in Micelles, J. Phys. Chem. B, Nov. 1998, pp. 9370-9374, vol. 102, No. 47.
Nikoobakht et al, Preparation and Growth Mechanism of Gold Nanorods (NRs) Using Seed-Mediated Growth Method, Chem. Mater., May 2003, pp. 1957-1962, vol. 15, No. 10.
Park et al, Precisely Shaped, Uniformly Formed Gold Nanocubes with Ultrahigh Reproducibility in Single-Particle Scattering and Surface-Enhanced Raman Scattering, Nano Lett., Oct. 2018, pp. 6475-6482, vol. 18, No. 10.
Pekcevik et al, Tunable Loading of Single-Stranded DNA on Gold Nanorods through the Displacement of Polyvinylpyrrolidone, Anal. Chem., 2013, pp. 9960-9967, vol. 85, No. 20.
Perrault et al, Synthesis and Surface Modification of Highly Monodispersed, Spherical Gold Nanoparticles of 50-200 nm, J. Am. Chem. Soc., Dec. 2009, pp. 17042-17043, vol. 131, No. 47.
Salih et al, Gold Nanocomposite Contact Lenses for Color blindness Management, ACS Nano, 2021, pp. 4870-4880, vol. 15.
Sanchez-Iglesias et al, High-Yield Seeded Growth of Monodisperse Pentatwinned Gold Nanoparticles through Thermally Induced Seed Twinning, J. Am. Chem. Soc., Jan. 2017, pp. 107-110, vol. 139, No. 1.
Shirshahi et al, Enhanced Thermal Stability and Biocompatibility of Gold Nanorods by Graphene Oxide, Plasmonics, 2018, pp. 1585-1594, vol. 13, No. 5.
Taylor et al, Below melting point photothermal reshaping of single gold nanorods driven by surface diffusion, ACS Nano, Dec. 2014, pp. 12071-12079, vol. 8, No. 12.
Vu-Quang et al, Pluronic F127-Folate Coated Super Paramagenic iron Oxide Nanoparticles as Contrast Agent for Cancer Diagnosis in Magnetic Resonance Imaging, Polymers, 2019, pp. 1-14, vol. 11, No. 743.
Wang et al, Increased expression of CCN2 in the red flashing light-induced myopia in guinea pigs, Biomed Res. Int., 2013, pp. 1-7, vol. 2013, Article ID 761823.
Zeng et al, Recent advances in surface plasmon resonance imaging: detection speed, sensitivity, and portability, Nanophotonics, 2017, pp. 1017-1030, vol. 6, No. 5.
Zhang et al, Ligand-Exchange Dynamics on Gold Nanocrystals: Direct Monitoring of Nanoscale Polyvinylpyrrolidone-Thiol Domain Surface Morphology, Langmuir, Apr. 2017, pp. 3576-3587, vol. 33, No. 15.

\* cited by examiner

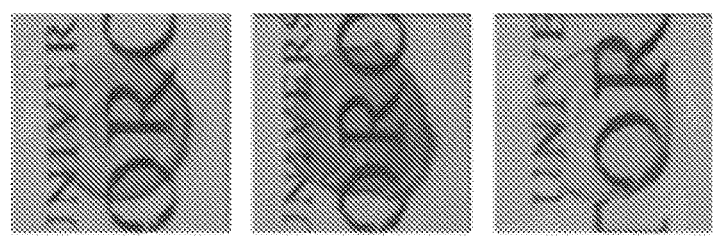
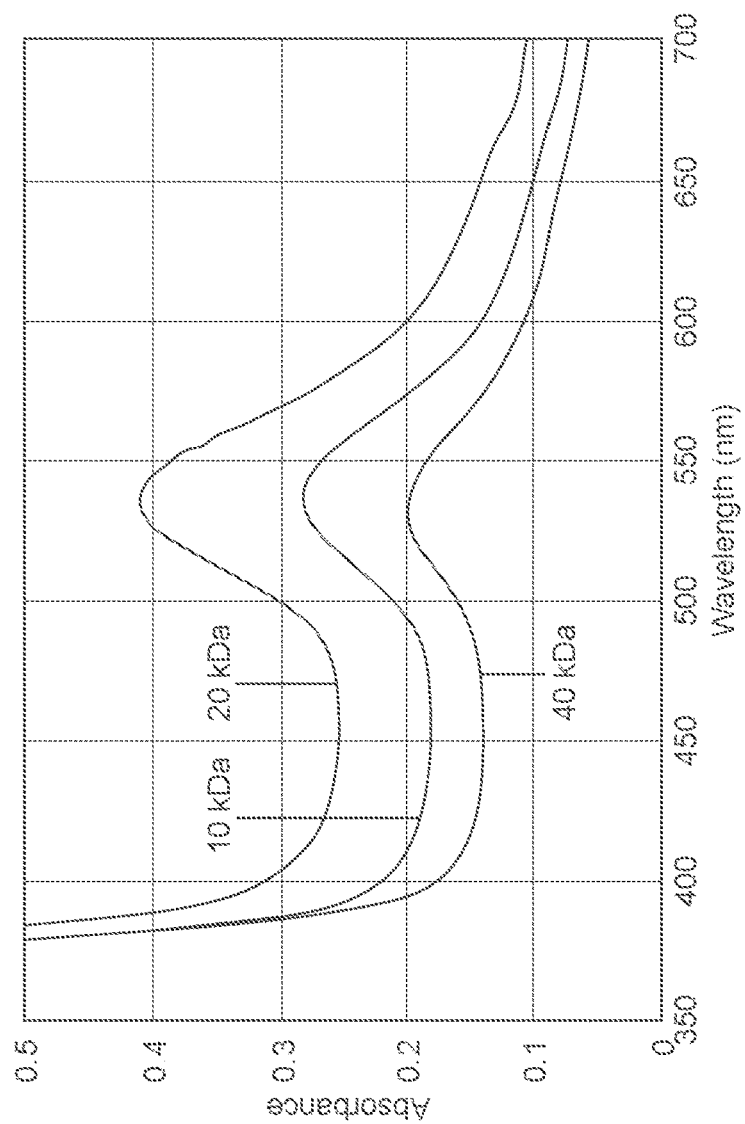
FIG. 8B
FIG. 8A

USING PARTICLES FOR LIGHT FILTERING

TECHNICAL FIELD

This application generally relates to optical filters. More particularly, this application relates to nanoparticles configured for filtering light.

BACKGROUND

A method describing the dispersion of metal nanoparticles for optical filtering in sunglasses is described in US 2007/0298242A1. Gold nanoparticles or dyes are dispersed in a polymer matrix, and the composite either acts as a lens itself or is used as a coating on one or both faces of a lens. US 2007/0298242A1 does not disclose information pertaining to the immobilization of the light filtering materials within the polymer matrix requisite for light filtering material integration into soft materials.

Another example of incorporating nanoparticles into polymer matrices is described in US20080203592A1 wherein a dry hydrogel contact lens is hydrated in a hydrating solution, wherein the hydrating solution comprises silver ions, silver nanoparticles, or combinations thereof, a lubricant or wetting agent, or combinations thereof. The silver nanoparticles and/or the lubricant or wetting agent are adsorbed onto and/or entrapped in the hydrogel contact lens during the extraction step and/or the hydrating step. While the method described may be translatable to gold nanoparticles and/or dyes, the patent does not disclose information pertaining to light filtering materials or to the chemical embedding of these materials in the final product. The nanoparticles are added after the contact lens has been cured which has implications for nanoparticle distribution within the contact lens.

Methods for blocking light in the green region have been described in U.S. Ser. No. 10/054,803B2. This patent aims to enhance color discrimination by using a multilayer optical film with a strong, narrow reflection band in the green region. This reference provides reflection as the mechanism of light filtering, the use of chemical dyes as the light filtering materials are chemical dyes, and the use of a multilayer optical film.

Methods for imbuing contact lenses to selectively block green light have been described in a paper by Badawy et al, 2018. The study involves the incubation of contact lenses in solutions of Rhodamine B dye dissolved in water to produce tinted contact lenses to treat colorblindness. Blocking green light (specifically 545-575 nm) is shown to improve color perception in a simulated color vision deficiency model. Similar to US20080203592A1, uptake of the light blocking materials depends on passive diffusion into the contact lens and the publication does not endeavor to embed the dyes into the contact lens via other processes.

However, improvements over prior art tools are needed.

SUMMARY

The present disclosure provides methods and materials for filtering light in select spectral region (e.g., the green region) using nanoparticles for increased control. Selective light blocking in the green light range is desirable for a large variety of soft biomaterials, including contact lenses. For safety, therapy, and cosmetics there is a strong need for biomaterials to be able to block specific ranges of wavelengths.

One general aspect includes a composition for light filtering. The composition also includes a base material; a plurality of gold nanoparticles dispersed in the base material, where the plurality of gold nanoparticles exhibit a peak light absorption value in the range of about 500 mm to about 600 am with a full width at half maximum (fwhm) of about 30 nm to about 100 nm; an anchoring mechanism dispersed in the base material, the anchoring mechanism may include methacryloyl-derived monomer; and a nanoparticle coating material disposed on at least a portion of the plurality of gold nanoparticles.

One general aspect includes a composition for light filtering. The composition also includes a base material may include a hema-based material. a plurality of metal nanoparticles dispersed in the base material, where the plurality of metal nanoparticles exhibit a peak light absorption value in the range of about 500 nm to about 600 nm; an anchoring mechanism dispersed in the base material, the anchoring mechanism may include methacryloyl-derived monomer; and a nanoparticle coating material disposed on at least a portion of the plurality of metal nanoparticles.

One general aspect includes a composition for light filtering. The composition also includes a base material may include a hema-based material. a plurality of plasmonic nanoparticles dispersed in the base material, where the plurality of plasmonic nanoparticles exhibit a peak light absorption value in the range of about 500 nm to about 600 nm; an anchoring mechanism dispersed in the base material, the anchoring mechanism may include methacryloyl-derived monomer; and a nanoparticle coating material disposed on at least a portion of the plurality of plasmonic nanoparticles.

One general aspect includes a contact lens comprising a composition for light filtering as described herein, wherein the contact lens is a free radical reaction product of a reactive mixture comprising: one or more silicone-containing components and one or more hydrophilic components, the contact lens having a water content of at least about 20 weight percent, preferably at least about 30 weight percent, and an oxygen permeability of at least about 80 barrers, preferably at least about 100 barrers.

BRIEF DESCRIPTION OF THE DRAWINGS

The following drawings show generally, by way of example, but not by way of limitation, various examples discussed in the present disclosure. In the drawings:

FIGS. 8A-8B depict PVA-MA nanoparticles (NPs) in contact lenses (FIG. 8B) and resultant absorbance spectra (FIG. 8A) according to embodiments of the disclosure.

DETAILED DESCRIPTION

Figure 1A:
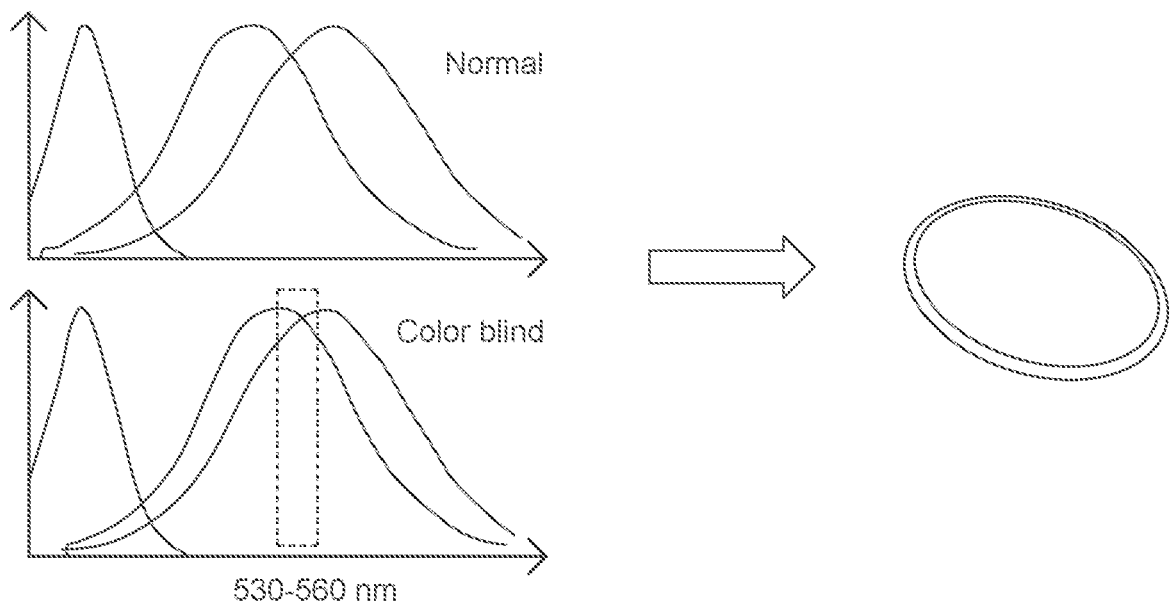
FIGS. 1A-1B depict a surface modification strategy according to embodiments of the disclosure including a reaction pathway for methacrylation of poly(vinyl alcohol) (PVA) (FIG. 1B).

Due to the spectral overlap of red and green cones in human eyes, selectively blocking in the green light range has been shown to improve color discrimination for people with red-green colorblindness. Moreover, the human eye is most sensitive to the color green and could be damaged if exposed to green light over extended periods of time. Due to variation between individuals with colorblindness and related indications, it may be desirable to design a light filtering material in a way that enables control and flexibility in both peak absorbance and bandwidth (e.g., Full Width at Half Maximum (FWHM) to tailor light filtering to specific target regions.

Stability and retention of light filtering materials embedded in contact lenses is desired. Such materials are regularly handled and worn by humans and may need to be stored for extended periods of time without losing functionality. As a result, light filtering materials must integrate within the biomaterial of choice, withstand curing and sterilization, and long-term storage. Curing and sterilization may comprise ultraviolet (UV) exposure and autoclaving, respectively.

Considering the aforementioned concerns, the requirements for light filtering materials include, but are not limited to, specificity towards certain wavelengths in the green light region, flexibility in terms of peak absorbance and Full Width at Half Maximum (FWHM) and long-term stability and retention.

While approaches to selective light filtering in the green region exist, there exists no solution that can integrate completely into the biomaterial, can be tuned to different wavelengths of interest without chemically altering the material, can withstand long-term storage and autoclaving, and can be readily adopted commercially.

The current disclosure relates to light-blocking materials. The current disclosure further relates to biomaterial integration of light-blocking materials. Methods of integration may comprise methods of light-blocking materials for use in contact lenses. The current disclosure addresses key gaps in current light-blocking techniques and materials for contact lenses. A method of providing light-blocking materials for biomaterial integration may comprise a nanoparticle (e.g., a gold nanoparticle). A nanoparticle may comprise a specified shape. Such method may further comprise a hydrogel. A hydrogel may immobilize nanoparticles. Such method may further comprise an anchoring mechanism. An anchoring mechanism may conjugate a nanoparticle to a biomaterial. Such method may further comprise a nanoparticle coating material. A nanoparticle coating material may stabilize a selected nanoparticle. A nanoparticle coating material may further support an anchoring mechanism.

The current disclosure relates to a nanoparticle coating material. A nanoparticle coating material may comprise a stabilizing mechanism. A nanoparticle coating material may comprise a polymer. A polymer may connect aspects of a disclosed light-blocking material. Such connection may function by stabilizing a selected nanoparticle. A nanoparticle coating material may further conjugate to an anchoring mechanism.

The current disclosure relates to nanoparticles. Nanoparticles may comprise gold nanoparticles, metal nanoparticles, or plasmonic nanoparticles, or a combination thereof. Gold nanoparticles may be in the size range of about 1 nm up to about 99 nm. Gold nanoparticles may comprise a variety of shapes including, but not limited to spheres, rods, bipyramids, stars, and other shapes known in the art. An absorbance profile of gold nanoparticles depends directly on morphology. Morphology may comprise size and shape. Nanoparticles may be modified to tune a light filtering spectrum of a final product. Such modifications may include altering morphology. Morphology may be altered to allow nanoparticles to block in the range of about 500 nm up to about 600 nm with a Full Width at Half Maximum (FWHM) of about 30 nm up to about 100 nm. Nanoparticles may block light by absorbing at defined wavelengths via localized surface plasmon resonance (LSPR).

The current disclosure relates to biomaterials. Such biomaterials may comprise gel-like biomaterials. Gel-like biomaterials may be medical devices. Gel-like biomaterials may comprise hydrogels. As a non-limiting example, a hydrogel may comprise a contact lens. Such contact lens may comprise a hydroxyethylmethacrylate (HEMA)-based, UV-curable contact lens hydrogel (e.g, Etafilcon A). A hydrogel may comprise another such monomer mixture further comprising mostly HEMA with other methacrylate and ethylene glycol monomers. Such monomer mixture may further comprise Irgacure 2959, a UV-activated initiator. Such monomer mixture may be exposed to UV light for 20 min in molds to cure and then incubated in hot water (60° C.) to remove a fully formed contact lenses. A light filtering material is added to a monomer mixture prior to curing so that they can chemically conjugate to the hydrogel matrix.

The current disclosure relates to an anchoring mechanism. Anchoring of a nanoparticle to a hydrogel by an anchoring mechanism may enable long-term stability following high-stress processes. High-stress processes may comprise increased thermal, mechanical, or other known stressors. As a non-limiting example, a high-stress process may comprise autoclaving. An anchoring mechanism may enable long-term stability following autoclaving. This may be facilitated by an anchoring mechanism chemically attaching (i.e. conjugating) a gold nanoparticle to a biomaterial. Such conjugation may prevent leaching under thermal or mechanical stress. As a non-limiting example, an anchoring mechanism may comprise glycidyl methacrylate, though other compounds known in the art may be used. Use of a methacrylate may facilitate biomaterial integration. As a further non-limiting example, a hydrogel comprising an Etafilcon A monomer mixture may comprise numerous methacrylates. This may allow a methacrylate anchoring mechanism to integrate completely within a contact lens.

The current disclosure relates to a nanoparticle coating material. A nanoparticle coating material may comprise a stabilizing mechanism. A nanoparticle coating material may connect aspects of a disclosed light-blocking material. Such connection may function by stabilizing a selected nanoparticle. A nanoparticle coating material may further conjugate to an anchoring mechanism. A nanoparticle coating material may comprise a polymer. A polymer may further comprise poly(vinyl alcohol) (PVA). A nanoparticle coating material may stabilize gold nanoparticles. Stabilization may be achieved through conjugation to a group in an anchoring mechanism via transesterification. In such an aspect, a nanoparticle coating material may be conjugated simultaneously to a nanoparticle and an anchoring mechanism. Conjugation to an anchoring mechanism may be facilitated by a nanoparticle coating being non-thiolated, however, other methods of conjugation are known in the art. Such conjugation may provide colloidal and thermal stability of a nanoparticle. PVA is also compatible with an exemplary hydrogel material and does not compromise the transparency, stability or biocompatibility.

The current disclosure relates to use of gold nanoparticles. Gold nanoparticles may be embedded in a hydrogel to form a light-blocking material. A light-blocking material may achieve specific light filtering in the green visible light region (about 500 nm up to about 600 nm). Use of gold nanoparticles may improve color perception and discrimination in people with red-green colorblindness. Use of specific gold nanoparticle sizes and shapes and combinations of specific gold nanoparticle sizes and shapes thereof may produce customizable light filtering spectra. Such light filtering spectra may fall within the green visible light range. The current disclosure further relates to integration of gold nanoparticles in a biomaterial. A biomaterial may comprise a hydrogel. Integration may be achieved via a multifunctional polymer.

The current disclosure relates to biomaterials. Biomaterials may comprise a hydrogel. A hydrogel may comprise customized cosmetic or therapeutic contact lenses. The current disclosure further relates to chemical integration into a hydrogel. Chemical integration may provide for light filtering materials that are immobilized and can be selectively patterned. The current disclosure relates to integration of light filtering materials into a variety of different biomaterials. Multiple gold nanoparticles of differing sizes and shapes may be combined. Such a combination may afford an ability to produce a final product with tunable, highly complex light filtering spectra in the green visible light range. The current disclosure relates to methods to control gold nanoparticle shape and size to produce highly specific light filtering spectra. Highly specific light filtering spectra may provide an ability to block green light to improve color perception of people with colorblindness. Improved color perception may be achieved by artificially improving the resolution between the red and green cones. The current disclosure relates to long-term stability and material integration. This may enable passive sensing applications and/or labeling of commercial products.

The current disclosure may comprise additional functionalities. The current disclosure may comprise use of a variety monomers to integrate into a variety of biomaterials. The current disclosure may further comprise a variety of shapes of gold nanoparticles to block a variety of target regions. The current disclosure may further comprise integration of more than one population of gold nanoparticles to block in various regions at once. Such loading may comprise different loading amounts of more than one population of gold nanoparticles to tune color intensity.

The present disclosure relates to a base material. Such a base material may comprise, a biomaterial, a biomaterial matrix, a hydrogel, and other such materials known in the art. Non-limiting examples of base materials are described below. The disclosure further relates to nanoparticles. Such nanoparticles may comprise gold. Gold nanoparticles may be grown from gold seeds, though other methods of synthesis are known in the art. Such nanoparticles may comprise shapes. Such shapes may comprise sphere shapes. Alternative shapes are known in the art and may comprise, but are not limited to, cubic shape, a nanorod shape, an octahedral shape, a decahedral shape, a cuboctahedral shape, a tetrahedral shape, a rhombic dodecahedral shape, a truncated ditetragonal prismatic shape, or a truncated bitetrahedral shape. Such gold nanoparticles may block light in a variety of ranges. As a non-limiting example, gold nanoparticles may block light in the range of about 500 nm up to about 600 nm. Alternative ranges exist and may include, but are not limited to, about 500 nm up to about 675 nm, about 500 nm up to about 650 nm, about 500 nm up to about 625 nm, about 525 nm up to about 600 nm, about 550 nm up to about 600 nm, or about 575 nm up to about 600 nm. The present disclosure further relates to a nanoparticle coating material (i.e. a stabilizing mechanism). Such stabilizing mechanism may comprise a polymer. Such polymers may comprise a variety of molecular weights. Such polymer may comprise polyvinyl alcohol (PVA). Alternative polymers are known in the art and may comprise, but are not limited to, poly(ethylene glycol) (PEG), polycarbonate, polyvinylpyrrolidone (PVP), polystyrene (PS), polycaprolactone (PCL), ethylene oligomers or polyethylene (PE), polypropylene (PP), and poly(methyl methacrylate) (PMMA), as well as copolymers or blends thereof. Such polymer may comprise molecular weights of about 10 kDa up to about 1300 kDa. The present disclosure relates to a method of coupling a gold nanoparticle to a stabilizing mechanism. Coupling may occur through chemical conjugation. Such coupling may be selective. Such coupling may enhance colloidal and/or thermal stability of a nanoparticle, as well as biocompatibility. The present disclosure relates to an anchoring mechanism. Such anchoring mechanism may comprise a methacrylate. Such anchoring mechanism may comprise a methacryloyl-derived monomer. Such anchoring mechanism may comprise glycidyl methacrylate (GMA). Such a methacrylate may further comprise a thiolated methacrylate dimer. Such thiolated methacrylate dimer may comprise bis(2-methacryloyl)oxyethyl disulfide (i.e. DSDMA), though other examples exist. Other such examples may include, but are not limited to, ethylene glycol dimethacrylate (EGDMA), tetraethylene glycol dimethacrylate (TEGDMA), trimethylolpropane trimethacrylate (TMPTMA), triallyl cyanurate (TAC), glycerol trimethacrylate, methacryloxyethyl vinylcarbonate (HEMAVc), allyl methacrylate, methylene bisacrylamide (MBA), polyethylene glycol dimethacrylate, 1,4-phenylene diacrylate, 1,4-phenylene dimethacrylate, 2,2-bis[4-(methacryloxyphenyl)-propane, 2,2-bis[4-(02-acryloxyethoxy)phenyl]propane, 2,2-bis[4-(2-hydroxy-3-methacryloxypropoxy)-phenyl]propane, and 4-vinylbenzyl methacrylate. An anchoring mechanism may also comprise a polymer. The present disclosure relates to a method of coupling a gold nanoparticle to an anchoring mechanism. Coupling may occur through chemical conjugation. Such coupling may be selective. Such coupling may enhance colloidal and/or thermal stability of a nanoparticle, as well as biocompatibility. In such coupling, an anchoring mechanism coupled to a gold nanoparticle may further couple to a nanoparticle coating material. Such a coupling may occur via transesterification, though other coupling methods are known in the art. The present disclosure further relates to a method of coupling an anchoring mechanism to a base material. A base material may comprise biomaterials, as described above. Conjugation of an anchoring mechanism to a gold nanoparticle and a base material may comprise a crosslinking. Such crosslinking may facilitate integration into a base material of a nanoparticle.

The present disclosure relates to a composition, wherein a composition may comprise a base material, nanoparticles, a nanoparticle coating material (i.e. a stabilizing mechanism), an anchoring mechanism, or any combination thereof. Nanoparticle light absorption may be tuned through tuning nanoparticle morphology. Morphology may be tuned by configuring an aspect ratio defined by a quotient of major and minor axes length, a volume, sharpness, and/or other related features. Aspect ratios may be tuned to about 1.9 up to about 2.9, though other such aspect ratios may be possible. As non-limiting examples, aspect ratios may range from about 1.9 up to about 2.8, about 1.9 up to about 2.7, about 1.9 up to about 2.6, about 1.9 up to about 2.5, about 1.9 up to about 2.4, about 1.9 up to about 2.3, about 1.9 up to about 2.2, about 1.9 up to about 2.1, about 1.9 up to about 2.0, about 2.0 up to about 2.8, about 2.0 up to about 2.7, about 2.0 up to about 2.6, about 2.0 up to about 2.5, about 2.0 up to about 2.4, about 2.0 up to about 2.3, about 2.0 up to about 2.2, or about 2.0 up to about 2.1. Volumes may be tuned to about 250 $nm^3$ up to about 30,000 $nm^3$, though other such volumes may be possible. As non-limiting examples, volumes may be tuned to about 1,250 $nm^3$ up to about 30,000 $nm^3$, about 2,250 $nm^3$ up to about 30,000 $nm^3$, about 3,250 $nm^3$ up to about 30,000 $nm^3$, about 4,250 $nm^3$ up to about 30,000 $nm^3$, about 5,250 $nm^3$ up to about 30,000 $nm^5$, about 6,250 $nm^3$ up to about 30,000 $nm^3$, about 7,250 $nm^3$ up to about 30,000 $nm^3$, about 8,250 $nm^3$ up to about 30,000 $nm^3$ about 9,250 $nm^3$ up to about 30,000 $nm^3$, about 10,250 $nm^3$ up to about 30,000 $nm^3$, about 11,250 $nm^3$ up to about 30,000 $nm^3$, about 12,250 $nm^3$ up to about 30,000 $nm^3$, about 13,250 $nm^3$ up to about 30,000 $nm^3$, about 14,250 $nm^3$ up to about 30,000 $nm^3$, about 15,250 $nm^3$ up to about 30,000 $nm^3$, about 16,250 $nm^3$ up to about 30,000 $nm^3$, about 17,250 $nm^3$ up to about 30,000 $nm^3$ about 18,250 $nm^3$ up to about 30,000 $nm^3$, about 19,250 $nm^3$ up to about 30,000 $nm^3$, about 20,250 $nm^3$ up to about 30,000 $nm^3$, about 21,250 $nm^3$ up to about 30,000 $nm^3$, about 22,250 $nm^3$ up to about 30,000 $nm^3$, about 23,250 $nm^3$ up to about 30,000 $nm^3$, about 24,250 $nm^3$ up to about 30,000 $nm^3$, about 25,250 $nm^3$ up to about 30,000 $nm^3$, about 26,250 $nm^3$ up to about 30,000 $nm^3$, about 27,250 $nm^3$ up to about 30,000 $nm^3$, about 28,250 $nm^3$ up to about 30,000 $nm^3$, or about 29,250 $nm^3$ up to about 30,000 $nm^3$.

Final light-blocking (light-filtering) profiles may be tuned through use of varying nanoparticles, nanoparticle coating materials (i.e. stabilizing mechanisms), anchoring mechanisms, and combinations thereof. Such tuning may result in a Full-Width at Half Maximum (FWHM) or "bandwidth" value of about 30 nm up to about 100 nm. As non-limiting examples, FWHM values may range from about 40 nm up to about 100 nm, about 50 nm up to about 100 nm, about 60 nm up to about 100 nm, about 70 nm up to about 100 nm, about 80 nm up to about 100 nm, or about 90 nm up to about 100 nm.

Additional capabilities relating to the current disclosure exist. The present disclosure additionally relates to a variety of polymers that may be grafted to the surface of nanoparticles. The use of varying polymers may enable the integration of nanoparticles into a variety of biomaterials. Such nanoparticles, may comprise a variety of shapes. The disclosure is therefore independent of a specific biomaterial. Moreover, the disclosure relates to the incorporation of a variety of shapes of nanoparticles further comprising a variety of stabilizing mechanisms into virtually any biomaterial of interest. Non-limiting examples of biomaterials may comprise hydrogel or silicone hydrogel material suitable for use in the formation of a soft contact lens. Such materials are known in the art and include Group 1-Low Water (<50% H2O) Nonionic Hydrogel Polymers (e.g., tefilcon, tetrafilcon A, crofilcon, helfilcon A, helfilcon B, mafilcon, polymacon, hioxifilcon B); Group 2-High Water (>>50% H2O) Nonionic Hydrogel Polymers (e.g., surfilcon A, lidofilcon A, lidofilcon B, netrafilcon A, hefilcon B, alphafilcon A, omafilcon A, omafilcon B, vasurfilcon A, hioxifilcon A, hioxifilcon D, nelfilcon A, bilafilcon A, hilafilcon B, acofilcon A, nesofilcon A); Group 3-Low Water (<50% H2O) Ionic Hydrogel Polymers (e.g., bufilcon A, deltafilcon A, phemfilcon); Group 4-High Water (>50% H2O) Ionic Hydrogel Polymers (e.g., bufilcon A, perfilcon A, etafilcon A, focofilcon A, ocufilcon A, ocufilcon B, ocufilcon C, ocufilcon D, ocufilcon E, ocufilcon F, phemfilcon A, methafilcon A, methafilcon B, vilfilcon A); and Silicone Hydrogel Polymers (e.g., lotrafilcon A, lotrafilcon B, galyfilcon A, senofilcon A, senofilcon C, sifilcon A, comfilcon A, enfilcon A, balafilcon A, delefilcon A, narafilcon B, narafilcon A, stenfilcon A, somofilcon A, fanfilcon A, samfilcon A, elastofilcon).

Definitions

It is to be understood that the invention is not limited to the details of construction or process steps set forth in the following description. The invention is capable of other embodiments and of being practiced or being carried out in various ways using the teaching herein.

With respect to the terms used in this disclosure, the following definitions are provided.

Unless defined otherwise, all technical and scientific terms used herein have the same meaning as commonly understood by one of ordinary skill in the art to which the invention belongs. The polymer definitions are consistent with those disclosed in the Compendium of Polymer Terminology and Nomenclature, IUPAC Recommendations 2008, edited by: Richard G. Jones, Jaroslav Kahovec, Robert Stepto, Edward S. Wilks, Michael Hess, Tatsuki Kitayama, and W. Val Metanomski. All publications, patent applications, patents, and other references mentioned herein are incorporated by reference.

As used herein, the term "(meth)" designates optional methyl substitution. Thus, a term such as "(meth)acrylates" denotes both methacrylates and acrylates.

The term "individual" includes humans and vertebrates.

The term "ophthalmic device" refers to any device which resides in or on the eye or any part of the eye, including the ocular surface. These devices can provide optical correction, cosmetic enhancement, vision enhancement, therapeutic benefit (for example as bandages) or delivery of active components such as pharmaceutical and nutraceutical components, or a combination of any of the foregoing. Examples of ophthalmic devices include but are not limited to lenses, optical and ocular inserts, including but not limited to punctal plugs, and the like. "Lenses" include soft contact lenses, hard contact lenses, hybrid contact lenses, intraocular lenses, and overlay lenses. The ophthalmic device may comprise a contact lens.

The term "contact lens" refers to an ophthalmic device that can be placed on the cornea of an individual's eye. The contact lens may provide corrective, cosmetic, or therapeutic benefit, including wound healing, the delivery of drugs or nutraceuticals, diagnostic evaluation or monitoring, ultraviolet light filtering, visible light or glare reduction, or any combination thereof. A contact lens can be of any appropriate material known in the art and can be a soft lens, a hard lens, or a hybrid lens containing at least two distinct portions with different physical, mechanical, or optical properties, such as modulus, water content, light transmission, or combinations thereof.

The ophthalmic devices and lenses described herein may be comprised of silicone hydrogels or conventional hydrogels. Silicone hydrogels typically include at least one hydrophilic monomer and at least one silicone-containing component that are covalently bound to one another in the cured device.

As used herein, the terms "physical absorption" or "chemical absorption" refer to processes in which atoms, molecules, or particles enter the bulk phase of a gas, liquid, or solid material and are taken up within the volume. Absorption in this manner may be driven by solubility, concentration gradients, temperature, pressure, and other driving forces known in the art.

As used herein, "adsorption" is defined as the deposition of a species onto a surface. The species that gets adsorbed on a surface is known as an adsorbate, and the surface on which adsorption occurs is known as an adsorbent. Examples of adsorbents may comprise clay, silica gel, colloids, metals, nanoparticles etc. Adsorption may occur via chemical or physical adsorption. Chemical adsorption may occur when an adsorbate is held to the an adsorbent via chemical bonds, whereas physical adsorption may occur when an adsorbate is joined to an adsorbent via weak van der Waal's forces.

As used herein, "antibacterial" means intended to kill or reduce the harmful effects of bacteria.

As used herein, "colloid" refers to dispersions of wherein one substance is suspended in another. Many examples of colloids in the art contain polymers. In this aspect, polymers may be adsorbed or chemically attached to the surface of particles suspended in the colloid, or the polymers may freely move in the colloidal suspension. The presence of polymers on particles in the suspension may directly relate to "colloidal stability," wherein "colloidal stability" refers to the tendency of a colloidal suspension to undergo sedimentation. Sedimentation would result in the falling of particles out of a colloid. Polymers adsorbed or chemically attached to a particle may affect its colloidal stability.

As used herein, the term "diffusion" refers to the process wherein there is a net flow of matter from one region to another. An example of such process is "surface diffusion," wherein particles move from one area of the surface of a subject to another area of the same surface. This can be caused by thermal stress or applied pressure.

As used herein, a "surfactant" refers to a substance that, when added to a liquid, reduces its surface tension, thereby increasing its spreading and wetting properties. Typical surfactants may be partly hydrophilic and partly lipophilic.

As used herein, the term "wetting agent" refers to a material that allows a liquid to more easy spread on or "wet" a surface. The high surface tension of water causes problems in many industrial processes where water-based solutions are used, as the solution is not able to wet the surface it is applied to. Wetting agents are commonly used to reduce the surface tension of water and thus help the water-based solutions to spread.

"Target macromolecule" means the macromolecule being synthesized from the reactive monomer mixture comprising monomers, macromers, prepolymers, cross-linkers, initiators, additives, diluents, and the like.

The term "polymerizable compound" means a compound containing one or more polymerizable groups. The term encompasses, for instance, monomers, macromers, oligomers, prepolymers, cross-linkers, and the like.

"Polymerizable groups" are groups that can undergo chain growth polymerization, such as free radical and/or cationic polymerization, for example a carbon-carbon double bond which can polymerize when subjected to radical polymerization initiation conditions. Non-limiting examples of free radical polymerizable groups include (meth)acrylates, styrenes, vinyl ethers, (meth)acrylamides, N-vinyllactams, N-vinylamides, O-vinylcarbamates, O-vinylcarbonates, and other vinyl groups. Preferably, the free radical polymerizable groups comprise (meth)acrylate, (meth)acrylamide, N-vinyl lactam, N-vinylamide, and styryl functional groups, and mixtures of any of the foregoing. More preferably, the free radical polymerizable groups comprise (meth)acrylates, (meth)acrylamides, and mixtures thereof. The polymerizable group may be unsubstituted or substituted. For instance, the nitrogen atom in (meth)acrylamide may be bonded to a hydrogen, or the hydrogen may be replaced with alkyl or cycloalkyl (which themselves may be further substituted).

Any type of free radical polymerization may be used including but not limited to bulk, solution, suspension, and emulsion as well as any of the controlled radical polymerization methods such as stable free radical polymerization, nitroxide-mediated living polymerization, atom transfer radical polymerization, reversible addition fragmentation chain transfer polymerization, organotellurium mediated living radical polymerization, and the like.

A "monomer" is a mono-functional molecule which can undergo chain growth polymerization, and in particular, free radical polymerization, thereby creating a repeating unit in the chemical structure of the target macromolecule. Some monomers have di-functional impurities that can act as cross-linking agents. A "hydrophilic monomer" is also a monomer which yields a clear single phase solution when mixed with deionized water at 25° C. at a concentration of 5 weight percent. A "hydrophilic component" is a monomer, macromer, prepolymer, initiator, cross-linker, additive, or polymer which yields a clear single phase solution when mixed with deionized water at 25° C. at a concentration of 5 weight percent. A "hydrophobic component" is a monomer, macromer, prepolymer, initiator, cross-linker, additive, or polymer which is slightly soluble or insoluble in deionized water at 25° C.

A "macromolecule" is an organic compound having a number average molecular weight of greater than 1500, and may be reactive or non-reactive.

A "macromonomer" or "macromer" is a macromolecule that has one group that can undergo chain growth polymerization, and in particular, free radical polymerization, thereby creating a repeating unit in the chemical structure of the target macromolecule. Typically, the chemical structure of the macromer is different than the chemical structure of the target macromolecule, that is, the repeating unit of the macromer's pendent group is different than the repeating unit of the target macromolecule or its mainchain. The difference between a monomer and a macromer is merely one of chemical structure, molecular weight, and molecular weight distribution of the pendent group. As a result, and as used herein, the patent literature occasionally defines monomers as polymerizable compounds having relatively low molecular weights of about 1,500 Daltons or less, which inherently includes some macromers. In particular, monomethacryloxypropyl terminated mono-n-butyl terminated polydimethylsiloxane (molecular weight=500-1500 g/mol) (mPDMS) and mono-(2-hydroxy-3-methacryloxypropyl)-propyl ether terminated mono-n-butyl terminated polydimethylsiloxane (molecular weight=500-1500 g/mol) (OH-mPDMS) may be referred to as monomers or macromers. Furthermore, the patent literature occasionally defines macromers as having one or more polymerizable groups, essentially broadening the common definition of macromer to include prepolymers. As a result, and as used herein, di-functional and multi-functional macromers, prepolymers, and crosslinkers may be used interchangeably.

A "silicone-containing component" is a monomer, macromer, prepolymer, cross-linker, initiator, additive, or polymer in the reactive mixture with at least one silicon-oxygen bond, typically in the form of siloxy groups, siloxane groups, carbosiloxane groups, and mixtures thereof.

Examples of silicone-containing components which are useful in this invention may be found in U.S. Pat. Nos. 3,808,178, 4,120,570, 4,136,250, 4,153,641, 4,740,533, 5,034,461, 5,070,215, 5,244,981, 5,314,960, 5,331,067, 5,371,147, 5,760, 100, 5,849,811, 5,962,548, 5,965,631, 5,998,498, 6,367,929, 6,822,016, 6,943,203, 6,951,894, 7,052,131, 7,247,692, 7,396,890, 7,461,937, 7,468,398, 7,538, 146, 7,553,880, 7,572,841, 7,666,921, 7,691,916, 7,786,185, 7,825, 170, 7,915,323, 7,994,356, 8,022,158, 8,163,206, 8,273,802, 8,399,538, 8,415,404, 8,420,711, 8,450,387, 8,487,058, 8,568,626, 8,937, 110, 8,937, 111, 8,940,812, 8,980,972, 9,056,878, 9,125,808, 9,140,825, 9,156,934, 9,170,349, 9,217,813, 9,244,196, 9,244,197, 9,260,544, 9,297,928, 9,297,929, and European Patent No. 080539. These patents are hereby incorporated by reference in their entireties.

A "polymer" is a target macromolecule composed of the repeating units of the monomers used during polymerization. Exemplary polymers may comprise polyethylene glycol (PEG), polyvinylpyrrolidone (PVP), polyvinyl alcohol (PVA), polycarbonate, and other polymers known in the art.

As used herein, the term "thermoplastic" refers to a property of polymers, wherein the polymer may be melted, solidified, and then successfully melted and solidified again. This process may be repeated several times for thermoplastic polymers without loss of functionality.

As used herein, the term "thermoset" refers to a property of polymers, wherein a thermoset polymer forms well-defined, irreversible, chemical networks that tend to grow in three dimensional directions through the process of curing, which can either occur due to heating or through the addition of a curing agent, therefore causing a crosslinking formation between its chemical components, and giving the thermoset a strong and rigid structure that can be added to other materials to increase strength. Once a thermoset polymer has formed networks during curing, the polymer cannot be re-cured to set in a different manner.

A "homopolymer" is a polymer made from one monomer; a "copolymer" is a polymer made from two or more monomers; a "terpolymer" is a polymer made from three monomers. A "block copolymer" is composed of compositionally different blocks or segments. Diblock copolymers have two blocks. Triblock copolymers have three blocks. "Comb or graft copolymers" are made from at least one macromer.

A "repeating unit" is the smallest group of atoms in a polymer that corresponds to the polymerization of a specific monomer or macromer.

An "initiator" is a molecule that can decompose into radicals which can subsequently react with a monomer to initiate a free radical polymerization reaction. A thermal initiator decomposes at a certain rate depending on the temperature; typical examples are azo compounds such as 1,1-azobisisobutyronitrile and 4,4'-azobis(4-cyanovaleric acid), peroxides such as benzoyl peroxide, tert-butyl peroxide, tert-butyl bydroperoxide, tert-butyl peroxybenzoate, dicumyl peroxide, and lauroyl peroxide, peracids such as peracetic acid and potassium persulfate as well as various redox systems. A photo-initiator decomposes by a photochemical process; typical examples are derivatives of benzil, benzoin, acetophenone, benzophenone, camphorquinone, and mixtures thereof as well as various monoacyl and bisacyl phosphine oxides and combinations thereof.

A "cross-linking agent" is a di-functional or multi-functional monomer or macromer which can undergo free radical polymerization at two or more locations on the molecule, thereby creating branch points and a polymeric network. Common examples are bis(2-methacryloyl)oxyethyl disulfide (DSDMA), cetyltrimethylammonium bromide (CTAB), cetyltrimethylammonium chloride (CTAC), ethylene glycol dimethacrylate, tetraethylene glycol dimethacrylate, trimethylolpropane trimethacrylate, methylene bisacrylamide, triallyl cyanurate, and the like.

A "prepolymer" is a reaction product of monomers which contains remaining polymerizable groups capable of undergoing further reaction to form a polymer.

A "polymeric network" is a cross-linked macromolecule that can swell but cannot dissolve in solvents. "Hydrogels" are polymeric networks that swell in water or aqueous solutions, typically absorbing at least 10 weight percent water. "Silicone hydrogels" are hydrogels that are made from at least one silicone-containing component with at least one hydrophilic component. Hydrophilic components may also include non-reactive polymers.

"Conventional hydrogels" refer to polymeric networks made from components without any siloxy, siloxane or carbosiloxane groups. Conventional hydrogels are prepared from reactive mixtures comprising hydrophilic monomers. Examples include 2-hydroxyethyl methacrylate ("HEMA"), N-vinyl pyrrolidone ("NVP"), N, N-dimethylacrylamide ("DMA") or vinyl acetate. U.S. Pat. Nos. 4,436,887, 4,495, 313, 4,889,664, 5,006,622, 5,039459, 5,236,969, 5,270,418, 5,298,533, 5,824,719, 6,420,453, 6,423,761, 6,767,979, 7,934,830, 8,138,290, and 8,389,597 disclose the formation of conventional hydrogels. Commercially available conventional hydrogels include, but are not limited to, etafilcon, genfilcon, hilafilcon, lenefilcon, nesofilcon, omafilcon, polymacon, and vifilcon, including all of their variants.

"Silicone hydrogels" refer to polymeric networks made from at least one hydrophilic component and at least one silicone-containing component. Examples of silicone hydrogels include acquafilcon, asmofilcon, balafilcon, comfilcon, delefilcon, enfilcon, falcon, fanfilcon, formofilcon, galyfilcon, lotrafilcon, narafilcon, riofilcon, samfilcon, senofilcon, somofilcon, and stenfilcon, including all of their variants, as well as silicone hydrogels as prepared in U.S. Pat. Nos. 4,659,782, 4,659,783, 5,244,981, 5,314,960, 5,331,067, 5,371, 147, 5,998,498, 6,087,415, 5,760,100, 5,776,999, 5,789,461, 5,849,811, 5,965,631, 6,367,929, 6,822,016, 6,867,245, 6,943,203, 7,247,692, 7,249,848, 7,553,880, 7,666,921, 7,786,185, 7,956, 131, 8,022, 158, 8,273,802, 8,399,538, 8,470,906, 8,450,387, 8,487,058, 8,507,577, 8,637,621, 8,703,891, 8,937, 110, 8,937,111, 8,940,812, 9,056,878, 9,057,821, 9,125,808, 9,140,825, 9,156,934, 9,170,349, 9,244, 196, 9,244, 197, 9,260,544, 9,297,928, 9,297,929 as well as WO 03/22321, WO 2008/061992, and US 2010/0048847. These patents are hereby incorporated by reference in their entireties.

As used herein, "gel-like" refers to a substance having properties generally relating to those associated with a gel. A "gel" may refer to a coherent mass consisting of a liquid in which particles are either dispersed or arranged in a fine network throughout the mass. A gel may be notably elastic or substantially solid and rigid (e.g. silica gel appears as a firm particle). Gels may also be seen as colloids in which the liquid medium has become viscous enough to behave more or less as a solid.

An "interpenetrating polymeric network" comprises two or more networks which are at least partially interlaced on the molecular scale but not covalently bonded to each other and which cannot be separated without braking chemical bonds. A "semi-interpenetrating polymeric network" comprises one or more networks and one or more polymers characterized by some mixing on the molecular level between at least one network and at least one polymer. A mixture of different polymers is a "polymer blend." A semi-interpenetrating network is technically a polymer blend, but in some cases, the polymers are so entangled that they cannot be readily removed.

The terms "reactive mixture" and "reactive monomer mixture" refer to the mixture of components (both reactive and non-reactive) which are mixed together and when subjected to polymerization conditions form the conventional or silicone hydrogels of the present invention as well as contact lenses made therefrom. The reactive monomer mixture may comprise reactive components such as the monomers, macromers, prepolymers, cross-linkers, and initiators, additives such as wetting agents, release agents, polymers, dyes, light absorbing compounds such as UV absorbers, pigments, dyes and photochromic compounds, any of which may be reactive or non-reactive but are capable of being retained within the resulting biomedical device, as well as pharmaceutical and nutraceutical compounds, and any diluents. It will be appreciated that a wide range of additives may be added based upon the biomedical device which is made and its intended use. Concentrations of components of the reactive mixture are expressed as weight percentages of all components in the reactive mixture, excluding diluent. When diluents are used, their concentrations are expressed as weight percentages based upon the amount of all components in the reactive mixture and the diluent.

"Reactive components" are the components in the reactive mixture which become part of the chemical structure of the polymeric network of the resulting hydrogel by covalent bonding, hydrogen bonding, electrostatic interactions, the formation of interpenetrating polymeric networks, or any other means.

The term "silicone hydrogel contact lens" refers to a hydrogel contact lens comprising at least one silicone containing component. Silicone hydrogel contact lenses generally have increased oxygen permeability compared to conventional hydrogels. Silicone hydrogel contact lenses use both their water and polymer content to transmit oxygen to the eye.

The term "multi-functional" refers to a component having two or more polymerizable groups. The term "mono-functional" refers to a component having one polymerizable group.

The terms "halogen" or "halo" indicate fluorine, chlorine, bromine, and iodine.

As used herein, the term "alkyl" refers to an unsubstituted or substituted linear or branched alkyl group containing the indicated number of carbon atoms. If no number is indicated, then alkyl (optionally including any substituents on alkyl) may contain 1 to 16 carbon atoms. Preferably, the alkyl group contains 1 to 10 carbon atoms, alternatively 1 to 7 carbon atoms, or alternatively 1 to 4 carbon atoms. Examples of alkyl include methyl, ethyl, propyl, isopropyl, butyl, iso-, sec- and tert-butyl, pentyl, hexyl, heptyl, 3-ethylbutyl, and the like. Examples of substituents on alkyl include 1, 2, or 3 groups independently selected from hydroxy, amino, amido, oxa, carboxy, alkyl carboxy, carbonyl, alkoxy, amido, carbamate, carbonate, halogen, phenyl, benzyl, thiol, and combinations thereof. "Alkylene" means a divalent alkyl group, such as —$CH_2$—; —$CH_2CH_2$—; —$CH_2CH_2CH_2$—, —$CH_2CH(CH_3)CH_2$—, and —$CH_2CH_2CH_2CH_2$—.

"Haloalkyl" refers to an alkyl group as defined above substituted with one or more halogen atoms, where each halogen is independently F, Cl, Br or I. A preferred halogen is F. Preferred haloalkyl groups contain 1-6 carbons, more preferably 1-4 carbons, and still more preferably 1-2 carbons. "Haloalkyl" includes perhaloalkyl groups, such as —$CF_3$— or —$CF_2CF_3$—. "Haloalkylene" means a divalent haloalkyl group, such as —$CH_2CF_2$—.

"Cycloalkyl" refers to an unsubstituted or substituted cyclic hydrocarbon containing the indicated number of ring carbon atoms. If no number is indicated, then cycloalkyl may contain 3 to 12 ring carbon atoms. Preferred are $C_3$-$C_8$ cycloalkyl groups, $C_3$-$C_7$ cycloalkyl, more preferably $C_4$-$C_7$ cycloalkyl, and still more preferably $C_5$-$C_8$ cycloalkyl. Examples of cycloalkyl include cyclopropyl, cyclobutyl, cyclopentyl, cyclohexyl, cycloheptyl and cyclooctyl. Examples of substituents on cycloalkyl include 1, 2, or 3 groups independently selected from alkyl, hydroxy, amino, amido, oxa, carbonyl, alkoxy, amido, carbamate, carbonate, halo, phenyl, benzyl, and combinations thereof. "Cycloalkylene" means a divalent cycloalkyl group, such as 1,2-cyclohexylene, 1,3-cyclohexylene, or 1,4-cyclohexylene.

"Heterocycloalkyl" refers to a cycloalkyl ring or ring system as defined above in which at least one ring carbon has been replaced with a heteroatom selected from nitrogen, oxygen, and sulfur. The heterocycloalkyl ring is optionally fused to or otherwise attached to other heterocycloalkyl rings and/or non-aromatic hydrocarbon rings and/or phenyl rings. Preferred heterocycloalkyl groups have from 5 to 7 members. More preferred heterocycloalkyl groups have 5 or 6 members. Heterocycloalkylene means a divalent heterocycloalkyl group.

"Aryl" refers to an unsubstituted or substituted aromatic hydrocarbon ring system containing at least one aromatic ring. The aryl group contains the indicated number of ring carbon atoms. If no number is indicated, then aryl may contain 6 to 14 ring carbon atoms. The aromatic ring may optionally be fused or otherwise attached to other aromatic hydrocarbon rings or non-aromatic hydrocarbon rings. Examples of aryl groups include phenyl, naphthyl, and biphenyl. Preferred examples of aryl groups include phenyl. Examples of substituents on aryl include 1, 2, or 3 groups independently selected from alkyl, hydroxy, amino, amido, oxa, carboxy, alkyl carboxy, carbonyl, alkoxy, amido, carbamate, carbonate, halo, phenyl, benzyl, and combinations thereof. "Arylene" means a divalent aryl group, for example 1,2-phenylene, 1,3-phenylene, or 1,4-phenylene.

"Heteroaryl" refers to an aryl ring or ring system, as defined above, in which at least one ring carbon atom has been replaced with a heteroatom selected from nitrogen, oxygen, and sulfur. The heteroaryl ring may be fused or otherwise attached to one or more heteroaryl rings, aromatic or nonaromatic hydrocarbon rings or heterocycloalkyl rings. Examples of heteroaryl groups include pyridyl, furyl, and thienyl. "Heteroarylene" means a divalent heteroaryl group.

"Alkoxy" refers to an alkyl group attached to the parent molecular moiety through an oxygen bridge. Examples of alkoxy groups include, for instance, methoxy, ethoxy, propoxy and isopropoxy. "Aryloxy" refers to an aryl group attached to a parent molecular moiety through an oxygen bridge. Examples include phenoxy. "Cyclic alkoxy" means a cycloalkyl group attached to the parent moiety through an oxygen bridge.

"Alkylamine" refers to an alkyl group attached to the parent molecular moiety through an —NH bridge. Alkyleneamine means a divalent alkylamine group, such as CH$_2$CH$_2$NH—.

"Ester" refers to a class of organic compounds having the general formula RCOOR', wherein R and R' are any organic combining groups. R and R' may be selected from functional groups comprising alkyls, substituted alkyls, alkylene, haloalkyls, cycloalkyls, heterocyloalkyls, aryls, heteroaryls, alkoxys, cycloalkoxys, alkylamines, siloxanyls, silyls, alkyleneoxys, oxaalkylenes, and the like. Definitions for the above mentioned functional groups are provided herein.

As used herein, "esterification" refers to a reaction producing an ester. The reaction often involves an alcohol and a Bronsted acid (such as a carboxylic acid, sulfuric acid, or phosphoric acid). Furthermore, the term "transesterification" refers to the reaction of an alcohol molecule and a preexisting ester molecule react to form a new ester. In some aspects, transesterification can be mediated by other compounds, such as carbonyldiimidazole.

"Siloxanyl" refers to a structure having at least one Si—O—Si bond. Thus, for example, siloxanyl group means a group having at least one Si—O—Si group (i.e. a siloxane group), and siloxanyl compound means a compound having at least one Si—O—Si group. "Siloxanyl" encompasses monomeric (e.g., Si—O—Si) as well as oligomeric/polymeric structures (e.g., —[Si—O]$_n$—, where n is 2 or more). Each silicon atom in the siloxanyl group is substituted with independently selected $R^A$ groups (where $R^A$ is as defined in formula A options (b)-(i)) to complete their valence.

"Silyl" refers to a structure of formula R$_3$Si— and "siloxy" refers to a structure of formula R$_3$Si—O—, where each R in silyl or siloxy is independently selected from trimethylsiloxy, C$_1$-C$_8$ alkyl (preferably C$_1$-C$_8$ alkyl, more preferably ethyl or methyl), and C$_3$-C$_8$ cycloalkyl.

"Alkyleneoxy" refers to groups of the general formula -(alkylene-O)$_p$— or —(O-alkylene)$_p$-, wherein alkylene is as defined above, and p is from 1 to 200, or from 1 to 100, or from 1 to 50, or from 1 to 25, or from 1 to 20, or from 1 to 10, wherein each alkylene is independently optionally substituted with one or more groups independently selected from hydroxyl, halo (e.g., fluoro), amino, amido, ether, carbonyl, carboxyl, and combinations thereof. If p is greater than 1, then each alkylene may be the same or different and the alkyleneoxy may be in block or random configuration. When alkyleneoxy forms a terminal group in a molecule, the terminal end of the alkyleneoxy may, for instance, be a hydroxy or alkoxy (e.g., HO—[CH$_2$CH$_2$O]$_p$— or CH$_3$O—[CH$_2$CH$_2$O]—). Examples of alkyleneoxy include polymethyleneoxy, polyethyleneoxy, polypropyleneoxy, polybutyleneoxy, and poly(ethyleneoxy-co-propyleneoxy).

"Oxaalkylene" refers to an alkylene group as defined above where one or more non-adjacent CH$_2$ groups have been substituted with an oxygen atom, such as CH$_2$CH$_2$OCH(CH$_3$)CH$_2$—. "Thiaalkylene" refers to an alkylene group as defined above where one or more non-adjacent CH$_2$ groups have been substituted with a sulfur atom, such as CH$_2$CH$_2$SCH(CH$_3$)CH$_2$—.

The term "linking group" refers to a moiety that links the polymerizable group to the parent molecule. The linking group may be any moiety that does not undesirably interfere with the polymerization of the compound of which it is a part. For instance, the linking group may be a bond, or it may comprise one or more alkylene, haloalkylene, amide, amine, alkyleneamine, carbamate, carboxylate (—CO$_2$—), disulfide, arylene, heteroarylene, cycloalkylene, heterocycloalkylene, alkyleneoxy, oxaalkylene, thiaalkylene, haloalkyleneoxy (alkyleneoxy substituted with one or more halo groups, e.g., —OCF$_2$—, —OCF$_2$CF$_2$—, —OCF$_2$CH$_2$—), siloxanyl, alkylenesiloxanyl, thiol, or combinations thereof. The linking group may optionally be substituted with 1 or more substituent groups. Suitable substituent groups may include those independently selected from alkyl, halo (e.g., fluoro), hydroxyl, HO-alkyleneoxy, CH$_3$O-alkyleneoxy, siloxanyl, siloxy, siloxy-alkyleneoxy-, siloxy-alkylene-alkyleneoxy- (where more than one alkyleneoxy groups may be present and wherein each methylene in alkylene and alkyleneoxy is independently optionally substituted with hydroxyl), ether, amine, carbonyl, carbamate, and combinations thereof. The linking group may also be substituted with a polymerizable group, such as (meth)acrylate (in addition to the polymerizable group to which the linking group is linked).

Preferred linking groups include C$_1$-C$_8$ alkylene (preferably C$_2$-C$_6$ alkylene) and C$_1$-C$_8$ oxaalkylene (preferably C$_2$-C$_6$ oxaalkylene), each of which is optionally substituted with 1 or 2 groups independently selected from hydroxyl and siloxy. Preferred linking groups also include carboxylate, amide, C$_1$-C$_8$ alkylene-carboxylate-C$_1$-C$_8$ alkylene, or C$_1$-C$_8$ alkylene-amide-C$_1$-C$_8$ alkylene.

When the linking group is comprised of combinations of moieties as described above (e.g., alkylene and cycloalkylene), the moieties may be present in any order. For instance, if in Formula E below, L is indicated as being -alkylene-cycloalkylene-, then Rg-L may be either Rg-alkylene-cycloalkylene-, or Rg-cycloalkylene-alkylene-. Notwithstanding this, the listing order represents the preferred order in which the moieties appear in the compound starting from the terminal polymerizable group (Rg) to which the linking group is attached. For example, if in Formula E, L and $L^2$ are indicated as both being alkylene-cycloalkylene, then Rg-L is preferably Rg-alkylene-cycloalkylene- and -$L^2$-Rg is preferably -cycloalkylene-alkylene-Rg.

As used herein, "oxidation" refers to a chemical process by which an atom of an element gains bonds to more electronegative elements, most commonly oxygen. In this process, the oxidized element increases its oxidation state, which represents the charge of an atom. Oxidation reactions are commonly coupled with "reduction" reactions, wherein the oxidation state of the reduced atom decreases.

As used herein, "anchoring" or "anchoring mechanism" refers to the process by which nanoparticles may become embedded in a colloidal or polymeric matrix. "Anchoring" may occur either chemically via crosslinking of a nanoparticle to members of an exemplary matrix or physically via entanglement of a molecule joined to the surface of a nanoparticle with members of an exemplary matrix.

As used herein, the "visible spectrum" refers to a range of wavelengths within the electromagnetic spectrum, wherein the range spans about 380 nm to 700 nm. The visible spectrum may be broken up into different wavelength regions corresponding to colors including red, orange, yellow, green, blue, indigo, and violet. Certain ranges of wavelengths falling in the visible spectrum have been known to cause damage to human eyes.

As used herein, the "ultraviolet (UV) spectrum" refers to a range of wavelengths within the electromagnetic spectrum, wherein the range spans about 10 nm to 400 nm.

As used herein, "ultraviolet (UV) irradiation" refers to exposure to electromagnetic waves falling in the ultraviolet spectrum of wavelengths, wherein UV irradiation uses selected times and intensity of exposure to achieve its effects, such as curing. UV irradiation can result in chemical (photo-crosslinking, photo-oxidation, or photochemical reactions) or physical (surface morphology, etc.) changes. Photochemical reactions caused by UV irradiation can be surface-limited or can take place deep inside the bulk (unlike plasma) of a material. Some exemplary sources of UV irradiation may comprise continuous wave (CW) UV-lamps with a moderate light and pulsed lasers.

As used herein, "light absorption" is defined as the phenomenon wherein electrons absorb the energy of incoming light waves (i.e. photons) and change their energy state. In order for this to occur, the incoming light waves must be at or near the energy levels of the electrons. The resultant absorption patterns characteristic to a given material may be displayed using an "absorption spectrum", wherein an "absorption spectrum" shows the change in absorbance of a sample as a function of the wavelength of incident light and may be measured using a spectrophotometer. Unique to an "absorption spectrum" is an "absorption peak", wherein the frequency or wavelength of a given sample exhibits the maximum or the highest spectral value of light absorption. With regards to light absorption of wavelengths of light corresponding to the visible spectrum, a material or matter absorbing light waves of certain wavelengths of the visible spectrum may cause an observer to not see these wavelengths in the reflected light.

As used herein, "Full Width at Half Maximum (FWHM)" refers to a parameter commonly used to describe the width of a portion of a curve or function and may be used in relation to absorbance spectra. It is given by the distance between points on the independent axis of a curve at which the function reaches half its maximum value on the dependent axis.

"Light filtering" may include absorbing, scattering, and/or extinguishing incident light. Light filtering may include the terms "light-blocking material", Light blocking may refer to a material with the ability to absorb, scatter, and/or extinguish incident light within a given region of the electromagnetic spectrum. Thus, the term "light-blocking material" of "lighting filtering material" encompasses particles that absorb, scatter, and/or extinguish incident light within a given region of the electromagnetic spectrum. The particles can be incorporated in varying quantities within an optically transparent substrate to achieve an optically transparent material which exhibits a desired level of light blocking at one or more wavelengths or a range of wavelengths within the electromagnetic spectrum. The percent blocking at a particular wavelength can be determined from the material's transmission spectrum, where blocking=100-percent transmission (% T).

As used herein, the term "light-blocking profile" or "light-blocking spectrum" refers to the absorption, scattering, and/or extinguishing spectrum of a light-blocking material.

The terms "green-light blocking" or "green-light absorbing" refer to the ability of certain particles to absorb, scatter, and/or extinguish incident light within the green region of the visible spectrum (e.g., between approximately 500 nm and 578 nm). Thus, the terms "green-light blocking" or "green-light absorbing" encompass particles that absorb, scatter, and/or extinguish incident light within the green region of the visible spectrum. The particles can be incorporated in varying quantities within an optically transparent substrate to achieve an optically transparent material which exhibits a desired level of green-light blocking at one or more wavelengths or a range of wavelengths within the green region.

"Nanoparticle (NP)" as used herein refers to a particle having at least one dimension that is less than 100 nm. In some cases, nanoparticles can have at least one dimension less than 50 nm. NP's may have a variety of shapes. In some instances, NP's may have a cubic shape, spherical shape, rod shape, bipyramidal shape, an octahedral shape, a decahedral shape, a cuboctahedral shape, a tetrahedral shape, a rhombic dodecahedral shape, a truncated ditetragonal prismatic shape, or a truncated bitetrahedral shape. "Plasmonic nanoparticle" as used herein refers to a metal nanoparticle that has unique optical properties due to local surface plasmon resonance that allow them to interact with light waves. These properties are tunable by changing the shape, size, composition or medium surrounding the nanoparticle's surface. It will be appreciated that the term includes all plasmonic nanoparticles of various shapes that gives rise to a surface plasmon absorption and scattering spectrum As used herein, a "shape-directing agent" is a surfactant or reagent used to grow nanoparticles into specific morphologies. By utilizing specific shape-directing agents, specific morphologies may be selected, allowing for the optical properties of the resultant nanoparticles to be tuned. Exemplary shape-directing agents may include, but are not limited to, $AgNO_3$, CTAB, CTAC, and other such agents known in the art.

As used herein, "anisotropic" describes a material wherein a given property of said material depends on the direction in which it is measured. Moreover, something that is "anisotropic" changes in size or in its physical properties according to the direction in which it is measured. Examples of anisotropic materials may comprise graphite, carbon fiber, nanoparticles, etc.

As used herein, "isotropic" describes a material wherein a given property of said material does not depend on the direction in which it is measured. Moreover, something that is "isotropic" remains constant in size or in its physical properties according to the direction in which it is measured.

As used herein, "surface energy" may refer to the excess energy (i.e., the difference in the energy between a nanoparticle and the same number of atoms in an infinitely extended solid). More broadly, the surface energy of a particle may define its stability given its morphology and directly relates to the thermodynamics of a given nanoparticle.

As used herein, "surface plasmon resonance (SPR)" refers to a phenomenon wherein the conduction electrons in the surface layer of a metal may become excited by photons of incident light with a certain angle of incidence, causing the excited conduction electrons to then propagate parallel to the metal surface in resonant oscillations (Zeng et al., 2017). With a constant light source wavelength and a thin metal surface layer, the certain angle that triggers SPR is dependent on the refractive index of the material near the metal surface. As used herein, "localized surface plasmon resonance (LSPR)" refers to an optical phenomena generated by light when it interacts with conductive nanoparticles that are smaller than the incident wavelength. As in surface plasmon resonance, the electric field of incident light can be deposited to collectively excite electrons of a conduction band, with the result being coherent localized plasmon oscillations with a resonant frequency that strongly depends on the composition, size, geometry, dielectric environment and separation distance of NP's.

As used herein, a "localized surface plasmon resonance (LSPR) peak" refers to the frequency or wavelength of incident light that exhibits the maximum or the highest spectral value of localized surface plasmon resonance. With regards to LSPR peaks, there are frequently two distinct peaks observed: a "longitudinal peak" and a "transverse peak". The former relates to the shape of the nanoparticle utilized, whereas the latter is a result of the innate properties of the material used. Gold, for instance, has an inherent transverse peak around 530 nm, though the longitudinal peak of a gold NP can be tuned by adjusting its morphology.

As used herein, "plasmonic light blocker" refers to a material with the ability to absorb, scatter, and/or extinguish incident light within a given region of the electromagnetic spectrum due to surface plasmonic resonance (SPR) or localized surface plasmonic resonance (LSPR), wherein the wavelength or range of wavelengths blocked correspond to the wavelength of incident light that induces the SPR or LSPR. Thus, the term "plasmonic light blocker" encompasses particles that absorb, scatter, and/or extinguish incident light within a given region of the electromagnetic spectrum due to SPR or LSPR. The particles can be incorporated in varying quantities within an optically transparent substrate to achieve an optically transparent material which exhibits a desired level of light filtering at one or more wavelengths or a range of wavelengths within the electromagnetic spectrum. The percent blocking at a particular wavelength can be determined from the material's transmission spectrum, where blocking=100-percent transmission (% T).

"Tuning" as used herein refers to changing the size, shape, surface chemistry or aggregation state of a nanoparticle in order to optimize the optical and electronic properties of the nanoparticle to a particular application. The plasmonic peak can be tuned to any wavelength by a suitable design of the nanoparticles as discussed in U.S. Pat. No. 9,005,890, herein incorporated in its entirety by reference.

Unless otherwise indicated, numeric ranges, for instance as in "from 2 to 10." are inclusive of the numbers defining the range (e.g., 2 and 10).

The term "biocompatible", as used herein is intended to describe materials that do not elicit a substantial detrimental response in vivo. In certain embodiments, the materials are "biocompatible" if they are not toxic to cells. In certain embodiments, materials are "biocompatible" if their addition to cells in vitro results in less than or equal to 20% cell death, and/or their administration in vivo does not induce inflammation or other such adverse effects.

The term "static concentration", as used herein, refers to a concentration of the trigger, which may vary from about 1% to about 10%. For example, the static concentration may vary by +/−10%, +/−5%, +/−2%, or +/−1%.

Unless otherwise indicated, ratios, percentages, parts, and the like are by weight.

Unless otherwise indicated, numeric ranges, for instance as in "from 2 to 10," are inclusive of the numbers defining the range (e.g., 2 and 10).

Devices

The resulting optically transparent materials can be used to form a variety of different articles, including optical lenses (e.g., eyeglass lenses, camera lenses, contact lenses, etc.), ophthalmic devices (e.g., contact lenses, corneal onlays, corneal inlays, intraocular lenses, overlay lenses, etc.), screen covers (e.g., a transparent sheet configured to cover a computer monitor, tablet screen, or cell phone screen), and housings for electronic devices having LED displays. Accordingly, also provided are optical lenses (e.g., eyeglass lenses, camera lenses, contact lenses, etc.), ophthalmic devices (e.g., contact lenses, corneal onlays, corneal inlays, intraocular lenses, overlay lenses, etc.), screen covers (e.g., a transparent sheet configured to cover a computer monitor, tablet screen, or cell phone screen), and housings for electronic devices having LED displays which are formed at whole or in part from the optically transparent materials described herein.

A variety of ophthalmic devices containing the nanoparticles described herein may be prepared, including hard contact lenses, soft contact lenses, corneal onlays, corneal inlays, intraocular lenses, or overlay lenses. Preferably, the ophthalmic device is a soft contact lens, which may be made from conventional or silicone hydrogel formulations.

Ophthalmic devices may be prepared by polymerizing a reactive mixture containing a population of the nanoparticles described herein, one or more monomers suitable for making the desired ophthalmic device, and optional components. In some cases, the reactive mixture may include, in addition to a population of the nanoparticles described above, one or more of: hydrophilic components, hydrophobic components, silicone-containing components, wetting agents such as polyamides, crosslinking agents, and further components such as diluents and initiators.

Silicone-Containing Components

Silicone-containing components suitable for use comprise one or more polymerizable compounds, where each compound independently comprises at least one polymerizable group, at least one siloxane group, and one or more linking groups connecting the polymerizable group(s) to the siloxane group(s). The silicone-containing components may, for instance, contain from 1 to 220 siloxane repeat units, such as the groups defined below. The silicone-containing component may also contain at least one fluorine atom.

The silicone-containing component may comprise: one or more polymerizable groups as defined above, one or more optionally repeating siloxane units; and one or more linking groups connecting the polymerizable groups to the siloxane units. The silicone-containing component may comprise: one or more polymerizable groups that are independently a (meth)acrylate, a styryl, a vinyl ether, a (meth)acrylamide, an N-vinyl lactam, an N-vinylamide, an O-vinylcarbamate, an O-vinylcarbonate, a vinyl group, or mixtures of the foregoing; one or more optionally repeating siloxane units; and one or more linking groups connecting the polymerizable groups to the siloxane units.

The silicone-containing component may comprise: one or more polymerizable groups that are independently a (meth)acrylate, a (meth)acrylamide, an N-vinyl lactam, an N-vinylamide, a styryl, or mixtures of the foregoing; one or more optionally repeating siloxane units, and one or more linking groups connecting the polymerizable groups to the siloxane units.

The silicone-containing component may comprise: one or more polymerizable groups that are independently a (meth)acrylate, a (meth)acrylamide, or mixtures of the foregoing; one or more optionally repeating siloxane units; and one or more linking groups connecting the polymerizable groups to the siloxane units.

Formula A. The silicone-containing component may comprise one or more polymerizable compounds of Formula A:

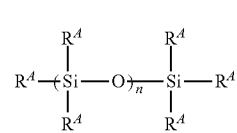

Formula A wherein:
at least one $R^4$ is a group of formula $R_g$-L- wherein $R_g$ is a polymerizable group and L is a linking group, and the remaining $R^4$ are each independently:
(a) $R_g$-L-,
(b) $C_1$-$C_{16}$ alkyl optionally substituted with one or more hydroxy, amino, amido, oxa, carboxy, alkyl carboxy, carbonyl, alkoxy, amido, carbamate, carbonate, halo, phenyl, benzyl, or combinations thereof,
(c) $C_3$-$C_{12}$ cycloalkyl optionally substituted with one or more alkyl, hydroxy, amino, amido, oxa, carbonyl, alkoxy, amido, carbamate, carbonate, halo, phenyl, benzyl, or combinations thereof,
(d) a $C_6$-$C_{14}$ aryl group optionally substituted with one or more alkyl, hydroxy, amino, amido, oxa, carboxy, alkyl carboxy, carbonyl, alkoxy, amido, carbamate, carbonate, halo, phenyl, benzyl, or combinations thereof,
(e) halo,
(f) alkoxy, cyclic alkoxy, or aryloxy,
(g) siloxy,
(h) alkyleneoxy-alkyl or alkoxy-alkyleneoxy-alkyl, such as polyethyleneoxyalkyl, polypropyleneoxyalkyl, or poly(ethyleneoxy-co-propyleneoxyalkyl), or
(i) a monovalent siloxane chain comprising from 1 to 100 siloxane repeat units optionally substituted with alkyl, alkoxy, hydroxy, amino, oxa, carboxy, alkyl carboxy, alkoxy, amido, carbamate, halo or combinations thereof; and n is from 0 to 500 or from 0 to 200, or from 0 to 100, or from 0 to 20, where it is understood that when n is other than 0, n is a distribution having a mode equal to a stated value. When n is 2 or more, the SiO units may carry the same or different $R^4$ substituents and if different $R^4$ substituents are present, the n groups may be in random or block configuration.

In Formula A, three $R^4$ may each comprise a polymerizable group, alternatively two $R^4$ may each comprise a polymerizable group, or alternatively one $R^4$ may comprise a polymerizable group.

Formula B. The silicone-containing component of formula A may be a mono-functional polymerizable compound of formula B:

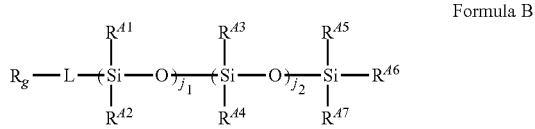

Formula B wherein:
Rg is a polymerizable group;
Lisa linking group;
j1 and j2 are each independently whole numbers from 0 to 220, provided that the sum of j1 and j2 is from 1 to 220;
$R^{41}$, $R^{42}$, $R^{43}$, $R^{44}$, RAS, and RAT are independently at each occurrence $C_1$-$C_6$ alkyl, $C_3$-$C_{12}$ cycloalkyl, $C_1$-$C_6$ alkoxy, $C_4$-$C_{12}$ cyclic alkoxy, alkoxy-alkyleneoxy-alkyl, aryl (e.g., phenyl), aryl-alkyl (e.g., benzyl), haloalkyl (e.g., partially or fully fluorinated alkyl), siloxy, fluoro, or combinations thereof, wherein each alkyl in the foregoing groups is optionally substituted with one or more hydroxy, amino, amido, oxa, carboxy, alkyl carboxy, carbonyl, alkoxy, carbamate, carbonate, halo, phenyl, or benzyl, each cycloalkyl is optionally substituted with one or more alkyl, hydroxy, amino, amido, oxa, carbonyl, alkoxy, carbamate, carbonate, halo, phenyl, or benzyl and each aryl is optionally substituted with one or more alkyl, hydroxy, amino, amido, oxa, carboxy, alkyl carboxy, carbonyl, alkoxy, carbamate, carbonate, halo, phenyl, or benzyl; and $R^{46}$ is siloxy, $C_1$-$C_8$ alkyl (e.g., $C_1$-$C_4$ alkyl, or butyl, or methyl), or aryl (e.g., phenyl), wherein alkyl and aryl may optionally be substituted with one or more fluorine atoms.

Formula B-1. Compounds of formula B may include compounds of formula B-1, which are compounds of formula B wherein j1 is zero and j2 is from 1 to 220, or j2 is from 1 to 100, or j2 is from 1 to 50, or j2 is from 1 to 20, or j2 is from 1 to 5, or j2 is 1.

B-2. Compounds of formula B may include compounds of formula B-2, which are compounds of formula B wherein j1 and j2 are independently from 4 to 100, or from 4 to 20, or from 4 to 10, or from 24 to 100, or from 10 to 100.

B-3. Compounds of formulae B, B-1, and B-2 may include compounds of formula B-3, which are compounds of formula B, B-1, or B-2 wherein $R^{41}$, $R^{42}$, $R^{43}$, and $R^{44}$ are independently at each occurrence $C_1$-$C_8$ alkyl or siloxy. Preferred alkyl are $C_1$-$C_3$ alkyl, or more preferably, methyl. Preferred siloxy is trimethylsiloxy.

B-4. Compounds of formulae B, B-1, B-2, and B-3 may include compounds of formula B-4, which are compounds of formula B, B-1, B-2, or B-3 wherein $R^{45}$ and $R^{47}$ are independently alkoxy-alkyleneoxy-alkyl, preferably they are independently a methoxy capped polyethyleneoxyalkyl of formula $CH_3O$—$[CH_2CH_2O]_p$—$CH_2CH_2CH_2$, wherein p is a whole number from 1 to 50.

B-5. Compounds of formulae B, B-1, B-2, and B-3 may include compounds of formula B-5, which are compounds of formula B, B-1, B-2, or B-3 wherein $R^{45}$ and $R^{47}$ are independently siloxy, such as trimethylsiloxy.

B-6. Compounds of formulae B, B-1, B-2, and B-3 may include compounds of formula B-6, which are compounds of formula B, B-1, B-2, or B-3 wherein $R^{45}$ and $R^{47}$ are independently $C_1$-$C_6$ alkyl, alternatively $C_1$-$C_4$ alkyl, or alternatively, butyl or methyl.

B-7. Compounds of formulae B, B-1, B-2, B-3, B-4, B-5, and B-6 may include compounds of formula B-7, which are compounds of formula B, B-1, B-2, B-3, B-4, B-5, or B-6 wherein $R^{46}$ is $C_1$-$C_8$ alkyl, preferably $C_1$-$C_6$ alkyl, more preferably $C_1$-$C_4$ alkyl (for example methyl, ethyl, n-propyl, or n-butyl). More preferably $R^{46}$ is n-butyl.

B-8. Compounds of formulae B, B-1, B-2, B-3, B-4, B-5, B-6, and B-7, may include compounds of formula B-8, which are compounds of formula B, B-1, B-2, B-3, B-4, B-5, B-6, or B-7 wherein Rg comprises styryl, vinyl carbonate, vinyl ether, vinyl carbamate, N-vinyl lactam, N-vinylamide, (meth)acrylate, or (meth)acrylamide. Preferably, Rg comprises (meth)acrylate, (meth)acrylamide, or styryl. More preferably, Rg comprises (meth)acrylate or (meth)acrylamide.

When Rg is (meth)acrylamide, the nitrogen group may be substituted with $R^{49}$ wherein $R^{49}$ is H, $C_1$-$C_8$ alkyl (preferably $C_1$-$C_4$ alkyl, such as n-butyl, n-propyl, methyl or ethyl), or $C_3$-$C_8$ cycloalkyl (preferably $C_5$-$C_6$ cycloalkyl), wherein alkyl and cycloalkyl are optionally substituted with one or more groups independently selected from hydroxyl, amide, ether, silyl (e.g., trimethylsilyl), siloxy (e.g., trimethylsiloxy), alkyl-siloxanyl (where alkyl is itself optionally substituted with fluoro), aryl-siloxanyl (where aryl is itself optionally substituted with fluoro), and silyl-oxaalkylene- (where the oxaalkylene is itself optionally substituted with hydroxyl).

B-9. Compounds of formulae B, B-1, B-2, B-3, B-4, B-5, B-6, B-7, and B-8 may include compounds of formula B-9, which are compounds of formula B, B-1, B-2, B-3, B-4, B-5, B-6, B-7, or B-8 wherein the linking group comprises alkylene (preferably $C_1$-$C_4$ alkylene), cycloalkylene (preferably $C_5$-$C_6$ cycloalkylene), alkyleneoxy (preferably ethyleneoxy), haloalkyleneoxy (preferably haloethyleneoxy), amide, oxaalkylene (preferably containing 3 to 6 carbon atoms), siloxanyl, alkylenesiloxanyl, carbamate, alkyleneamine (preferably $C_1$-$C_6$ alkyleneamine), or combinations of two or more thereof, wherein the linking group is optionally substituted with one or more substituents independently selected from alkyl, hydroxyl, ether, amine, carbonyl, siloxy, and carbamate.

B-10. Compounds of formulae B, B-1, B-2, B-3, B-4, B-5, B-6, B-7, B-8, and B-9 may include compounds of formula B-10, which are compounds of formula B, B-1, B-2, B-3, B-4, B-5, B-6, B-7, B-8, or B-9 wherein the linking group is alkylene-siloxanyl-alkylene-alkyleneoxy-, or alkylene-siloxanyl-alkylene-[alkyleneoxy-alkylene-siloxanyl]$_q$-alkyleneoxy-, where q is from 1 to 50.

B-11. Compounds of formulae B, B-1, B-2, B-3, B-4, B-5, B-6, B-7, B-8, and B-9 may include compounds of formula B-11, which are compounds of formula B, B-1, B-2, B-3, B-4, B-5, B-6, B-7, B-8, or B-9 wherein the linking group is $C_1$-$C_6$ alkylene, preferably $C_1$-$C_3$ alkylene, more preferably n-propylene.

B-12. Compounds of formulae B, B-1, B-2, B-3, B-4, B-5, B-6, B-7, B-8, and B-9 may include compounds of formula B-12, which are compounds of formula B, B-1, B-2, B-3, B-4, B-5, B-6, B-7, B-8, or B-9 wherein the linking group is alkylene-carbamate-oxaalkylene. Preferably, the linking group is $CH_2CH_2CH(H)$—$C(=O)$—$O$—$CH_2CH_2$—$O$—$CH_2CH_2CH_2$.

B-13. Compounds of formulae B, B-1, B-2, B-3, B-4, B—S, B-6, B-7, B-8, and B-9 may include compounds of formula B-13, which are compounds of formula B, B-1, B-2, B-3, B-4, B-5, B-6, B-7, B-8, or B-9 wherein the linking group is oxaalkylene. Preferably, the linking group is $CH_2CH_2$—$O$—$CH_2CH_2CH_2$.

B-14. Compounds of formulae B, B-1, B-2, B-3, B-4, B-5, B-6, B-7, B-8, and B-9 may include compounds of formula B-14, which are compounds of formula B, B-1, B-2, B-3, B-4, B-5, B-6, B-7, B-8, or B-9 wherein the linking group is alkylene-[siloxanyl-alkylene]$_q$—, where q is from 1 to 50. An example of such a linking group is: —$(CH_2)_3$—$[Si(CH_3)_2$—$O$—$Si(CH_3)_2$—$(CH_2)_2]_q$—.

B-15. Compounds of formulae B, B-1, B-2, B-3, B-4, B-5, B-6, B-7, B-8, and B-9 may include compounds of formula B-15, which are compounds of formula B, B-1, B-2, B-3, B-4, B-5, B-6, B-7, B-8, or B-9 wherein the linking group is alkyleneoxy-carbamate-alkylene-cycloalkylene-carbamate-oxaalkylene, wherein cycloalkylene is optionally substituted with or 1, 2, or 3 independently selected alkyl groups (preferably $C_1$-$C_3$ alkyl, more preferably methyl). An example of such a linking group is —$[OCH_2CH_2]_q$—$OC(=O)$—$NH$—$CH_2$-[1,3-cyclohexylene]-$NHC(=O)O$—$CH_2CH_2$—$O$—$CH_2CH_2$, wherein the cyclohexylene is substituted at the 1 and 5 positions with 3 methyl groups.

B-16. Compounds of formulae B, B-1, B-2, B-3, B-4, B-5, B-6, B-7, B-8, and B-9 may include compounds of formula B-16, which are compounds of formula B, B-1, B-2, B-3, B-4, B-5, B-6, B-7, B-8, or B-9 wherein $R_g$ comprises styryl and the linking group is alkyleneoxy wherein each alkylene in alkyleneoxy is independently optionally substituted with hydroxyl. An example of such a linking group is —O—$(CH_2)_3$—. Another example of such a linking group is —O—$CH_2CH(OH)CH_2$—O—$(CH_2)_3$.

B-17. Compounds of formulae B, B-1, B-2, B-3, B-4, B-5, B-6, B-7, B-8, and B-9 may include compounds of formula B-17, which are compounds of formula B, B-1, B-2, B-3, B-4, B-5, B-6, B-7, B-8, or B-9 wherein Rg comprises styryl and the linking group is alkyleneamine. An example of such a linking group is —NH—$(CH_2)_3$—.

B-18. Compounds of formulae B, B-1, B-2, B-3, B-4, B-5, B-6, B-7, B-8, and B-9 may include compounds of formula B-18, which are compounds of formula B, B-1, B-2, B-3, B-4, B-5, B-6, B-7, B-8, or B-9 wherein the linking group is oxaalkylene optionally substituted with hydroxyl, siloxy, or silyl-alkyleneoxy (where the alkyleneoxy is itself optionally substituted with hydroxyl). An example of such a linking group is —$CH_2CH(G)CH_2$—O—$(CH_2)_3$—, wherein G is hydroxyl. In another example, G is $R_3SiO$— wherein two R groups are trimethylsiloxy and the third is $C_1$-$C_8$ alkyl (preferably $C_1$-$C_3$ alkyl, more preferably methyl) or the third is $C_3$-$C_8$cycloalkyl. In a further example, G is $R_3Si$—$(CH_2)_3$—O—$CH_2CH(OH)CH_2$—O—, wherein two R groups are trimethylsiloxy and the third is $C_1$-$C_3$ alkyl (preferably $C_1$-$C_3$ alkyl, more preferably methyl) or $C_3$-$C_8$ cycloalkyl. In a still further example, G is a polymerizable group, such as (meth)acrylate. Such compounds may function as crosslinkers.

B-19. Compounds of formulae B, B-1, B-2, B-3, B-4, B-5, B-6, B-7, B-8, and B-9 may include compounds of formula B-19, which are compounds of formula B, B-1, B-2, B-3, B-4, B-5, B-6, B-7, B-8, or B-9 wherein Rg comprises styryl and the linking group is amine-oxaalkylene optionally substituted with hydroxyl. An example of such a linking group is —O—$(CH_2)_2$—$N(H)C(=O)O$—$(CH_2)_2$—O—$(CH_2)_3$—.

B-20. Compounds of formulae B, B-1, B-2, B-3, B-4, B-5, B-6, B-7, B-8, and B-9 may include compounds of formula B-20, which are compounds of formula B, B-1, B-2, B-3, B-4, B-5, B-6, B-7, B-8, or B-9 wherein Rg comprises styryl and the linking group is alkyleneoxy-carbamate-oxaalkylene. An example of such a linking group is —O—$(CH_2)_2$—$N(H)C(=O)O$—$(CH_2)_2$—O—$(CH_2)_3$—.

B-21. Compounds of formulae B, B-1, B-2, B-3, B-4, B-5, B-6, B-7, B-8, and B-9 may include compounds of formula B-21, which are compounds of formula B, B-1, B-2, B-3, B-4, B-5, B-6, B-7, B-8, or B-9 wherein the linking group is alkylene-carbamate-oxaalkylene. An example of such a linking group is —$(CH)_2$—$N(H)C(=O)O$—$(CH_2)_2$—O—$(CH_2)_3$—.

Formula C. Silicone-containing components of formulae A, B, B-1, B-2, B-3, B-4, B-5, B-6, B-7, B-8, B-9, B-10, B-11, B-12, B-13, B-14, B-15, B-18, and B-21 may include compounds of formula C, which are compounds of formula A, B, B-1, B-2, B-3, B-4, B-5, B-6, B-7, B-8, B-9, B-10, B-11, B-12, B-13, B-14, B-15, B-18, or B-21 having the structure:

Formula C

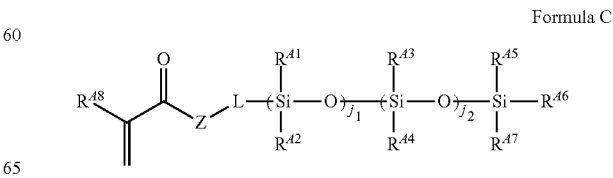

wherein
   wherein
   $R^{48}$ is hydrogen or methyl;
   Z is O, S, or $N(R^{49})$; and
   L, j1, j2, RAJ, $R^{42}$, $R^{43}$, $R^{44}$, RAS, $R^{46}$, $R^{47}$, and RAP are as defined in formula B or its various sub-formulae (e.g., B-1, B-2, etc.).

C-1. Compounds of formula C may include (meth)acrylates of formula C-1, which are compounds of formula C wherein Z is O.

C-2. Compounds of formula C may include (meth)acrylamides of formula C-2; which are compounds of formula C wherein Z is $N(R^{49})$, and $R^{49}$ is H.

C-3. Compounds of formulae C may include (meth)acrylamides of formula C-3, which are compounds of formula C wherein Z is $N(R^{43})$, and $R^{49}$ is $C_1$-$C_8$ alkyl that is unsubstituted or is optionally substituted as indicated above. Examples of $R^{49}$ include $CH_3$, —$CH_2CH(OH)CH_2(OH)$, —$(CH_2)_3$-siloxanyl, —$(CH_2)_3$—$SiR_3$, and —$CH_2CH(OH)CH)$—O—$(CH_2)_3$—$SiR_3$ where each R in the foregoing groups is independently selected from trimethylsiloxy, $C_1$-$C_8$ alkyl (preferably $C_1$-$C_3$ alkyl, more preferably methyl), and $C_3$-$C_8$ cycloalkyl. Further examples of $R^{49}$ include: —$(CH_2)_3$—$Si(Me)(SiMe_3)_2$, and $(CH_2)_3$—$Si(Me_2)$—$[O$—$SiMe_2]_{1-10}$—$CH_3$.

Formula D. Compounds of formula C may include compounds of formula D:

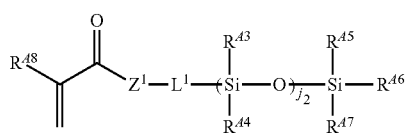

Formula D wherein
   $R^{48}$ is hydrogen or methyl;
   $Z^1$ is O or $N(R^{49})$;
   $L^1$ is alkylene containing 1 to 8 carbon atoms, or oxaalkylene containing 3 to 10 carbon atoms, wherein $L^1$ is optionally substituted with hydroxyl; and
   j2, $R^{43}$, $R^{44}$, $R^{45}$, $R^{46}$, $R^{47}$, and $R^{49}$ are as defined above in formula B or its various sub-formulae (e.g., B-1, B-2, etc.).

D-1. Compounds of formula D may include compounds of formula D-1, which are compounds of formula D wherein $L^1$ is $C_2$-$C_5$ alkylene optionally substituted with hydroxyl. Preferably $L^1$ is n-propylene optionally substituted with hydroxyl.

D-2. Compounds of formula D may include compounds of formula D-2, which are compounds of formula D wherein $L^1$ is oxaalkylene containing 4 to 8 carbon atoms optionally substituted with hydroxyl. Preferably $L^1$ is oxaalkylene containing five or six carbon atoms optionally substituted with hydroxyl. Examples include —$(CH_2)_2$—O—$(CH_2)_3$—, and $CH_2CH(OH)CH_2$—O—$(CH_2)_3$—.

D-3. Compounds of formulae D, D-1, and D-2 may include compounds of formula D-3, which are compounds of formula D, D-1, or D-2 wherein $Z^1$ is O.

D-4. Compounds of formulae D, D-1, and D-2 may include compounds of formula D-4, which are compounds of formula D, D-1, or D-2 wherein $Z^1$ is $N(R^4)$, and $R^{49}$ is H.

D-5. Compounds of formulae D, D-1, and D-2 may include compounds of formula D-5, which are compounds of formula D, D-1, or D-2 wherein $Z^1$ is $N(R^{49})$, and $R^{49}$ is $C_1$-$C_4$ alkyl optionally substituted with 1 or 2 substituents selected from hydroxyl, siloxy, and $C_1$-$C_6$ alkyl-siloxanyl.

D-6. Compounds of formulae D, D-1, D-2, D-3, D-4, and D-5 may include compounds of formula D-6, which are compounds of formula D, D-1, D-2, D-3, D-4, or D-5 wherein j2 is 1.

D-7. Compounds of formulae D, D-1, D-2, D-3, D-4, and D-5 may include compounds of formula D-7, which are compounds of formula D, D-1, D-2, D-3, D-4, or D-5 wherein j2 is from 2 to 220, or from 2 to 100, or from 10 to 100, or from 24 to 100, or from 4 to 20, or from 4 to 10.

D-8. Compounds of formulae D, D-1, D-2, D-3, D-4, D-S, D-6, and D-7 may include compounds of formula D-8, which are compounds of formula D, D-1, D-2, D-3, D-4, D-5, D-6, or D-7 wherein $R^{43}$, $R^{44}$, RAS, RAG, and $R^{47}$ are independently $C_1$-$C_6$ alkyl or siloxy. Preferably $R^{43}$, $R^{44}$, RAS, $R^{46}$, and $R^{47}$ are independently selected from methyl, ethyl, n-propyl, n-butyl, and trimethylsiloxy. More preferably, $R^{43}$, $R^{44}$, RAS, RAG, and $R^{47}$ are independently selected from methyl, n-butyl, and trimethylsiloxy.

D-9. Compounds of formulae D, D-1, D-2, D-3, D-4, D-5, D-6, and D-7 may include compounds of formula D-9, which are compounds of formula D, D-1, D-2, D-3, D-4, D-5, D-6, or D-7 wherein $R^{43}$ and $R^{44}$ are independently $C_1$-$C_6$ alkyl (e.g., methyl or ethyl) or siloxy (e.g., trimethylsiloxy), and RAS, $R^{46}$, and $R^{47}$ are independently $C_1$-$C_6$ alkyl (e.g., methyl, ethyl, n-propyl, or n-butyl).

Formula E. The silicone-containing component may comprise a multi-functional silicone-containing component. Thus, for example, the silicone-containing component of formula A may comprise a bifunctional material of formula E:

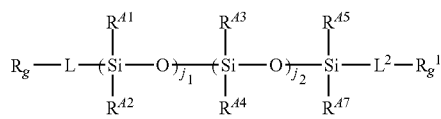

Formula E wherein
   Rg, L, j1, j2, $R^{41}$, $R^{42}$, $R^{43}$, $R^{44}$, $R^{45}$, and $R^{47}$ are as defined above for formula B or its various sub-formulae (e.g., B-1, B-2, etc.);
   $L^2$ is a linking group; and
   $R_g^1$ is a polymerizable group.

E-1. Compounds of formula E may include compounds of formula E-1, which are compounds of formula E wherein Rg and $Rg^1$ are each a vinyl carbonate of structure $CH_2$—CH—O—C(=O)—O— or structure $CH_2$=$C(CH_3)$—O—C(=O)—O—.

E-2. Compounds of formula E may include compounds of formula E-2, which are compounds of formula E wherein Rg and $Rg^1$ are each (meth)acrylate.

E-3. Compounds of formula E may include compounds of formula E-3, which are compounds of formula E wherein Rg and $Rg^1$ are each (meth)acrylamide, wherein the nitrogen group may be substituted with $R^{49}$ (wherein $R^{49}$ is as defined above).

E-4. Suitable compounds of formulae E, E-1, E-2, and E-3 include compounds of formula E-4, which are compounds of formula E, E-1, E-2, or E-3 wherein j1 is zero and j2 is from 1 to 220, or j2 is from 1 to 100, or j2 is from 1 to 50, or j2 is from 1 to 20.

E-5. Suitable compounds of formulae E, E-1, E-2, and E-3 include compounds of formula E-5, which are compounds of formula E, E-1, E-2, or E-3, wherein j1 and j2 are independently from 4 to 100.

E-6. Suitable compounds of formulae E, E-1, E-2, E-3, E-4, and E-5 include compounds of formula E-6, which are compounds of formula E, E-1, E-2, E-3, E-4, or E-5 wherein $R^{A1}$, $R^{A2}$, $R^{A3}$, $R^{A4}$, and $R^{A5}$ are independently at each occurrence $C_1$-$C_6$ alkyl, preferably they are independently $C_1$-$C_3$ alkyl, or preferably, each is methyl.

E-7. Suitable compounds of formulae E, E-1, E-2, E-3, E-4, E-5, and E-6 include compounds of formula E-7, which are compounds of formula E, E-1, E-2, E-3, E-4, E-5, or E-6 wherein $R^{A7}$ is alkoxy-alkyleneoxy-alkyl, preferably it is a methoxy capped polyethyleneoxyalkyl of formula $CH_3O-[CH_2CH_2O]_p-CH_2CH_2CH_2$, wherein p is a whole number from 1 to 50, or from 1 to 30, or from 1 to 10, or from 6 to 10.

E-8. Suitable compounds of formulae E, E-1, E-2, E-3, E-4, E-5, E-6, and E-7 include compounds of formula E-8, which are compounds of formula E, E-1, E-2, E-3, E-4, E-5, E-6, or E-7 wherein L comprises alkylene, carbamate, siloxanyl, cycloalkylene, amide, haloalkyleneoxy, oxaalkylene, or combinations of two or more thereof, wherein the linking group is optionally substituted with one or more substituents independently selected from alkyl, hydroxyl, ether, amine, carbonyl, and carbamate.

E-9. Suitable compounds of formulae E, E-1, E-2, E-3, E-4, E-5, E-6, E-7, and E-8 include compounds of formula E-9, which are compounds of formula E, E-1, E-2, E-3, E-4, B-5, B-6, B-7, or E-8 wherein $L^2$ comprises alkylene, carbamate, siloxanyl, cycloalkylene, amide, haloalkyleneoxy, oxaalkylene, or combinations of two or more thereof, wherein the linking group is optionally substituted with one or more substituents independently selected from alkyl, hydroxyl, ether, amine, carbonyl, and carbamate.

Examples of silicone-containing components suitable for use in the invention include, but are not limited to, compounds listed in the table below. Where the compounds in the table below include polysiloxane groups, the number of Si repeat units in such compounds, unless otherwise indicated, is preferably from 3 to 100, more preferably from 3 to 40, or still more preferably from 3 to 20.

1. mono-methacryloxypropyl terminated mono-n-butyl terminated polydimethylsiloxanes (mPDMS) (preferably containing from 3 to 15 SiO repeating units)
2. mono-acryloxypropyl terminated mono-n-butyl terminated polydimethylsiloxane
3. mono(meth)acryloxypropyl terminated mono-n-methyl terminated polydimethylsiloxane
4. mono(meth)acryloxypropyl terminated mono-n-butyl terminated polydiethylsiloxane
5. mono(meth)acryloxypropyl terminated mono-n-methyl terminated polydiethylsiloxane
6. mono(meth)acrylamidoalkylpolydialkylsiloxanes
7. mono(meth)acryloxyalkyl terminated mono-alkyl polydiarylsiloxanes
8. 3-methacryloxypropyltris(trimethylsiloxy)silane (TRIS)
9. 3-methacryloxypropylbis(trimethylsiloxy)methylsilane
10. 3-methacryloxypropylpentamethyl disiloxane
11. mono(meth)acrylamidoalkylpolydialkylsiloxanes
12. mono(meth)acrylamidoalkyl polydimethylsiloxanes
13. N-(2,3-dihydroxypropane)-N'-(propyl tetra(dimethylsiloxy) dimethylbutylsilane)acrylamide
14. N-[3-tris(trimethylsiloxy)silyl]-propyl acrylamide (TRIS-Am)
15. 2-hydroxy-3-[3-methyl-3,3-di(trimethylsiloxy)silylpropoxy]-propyl methacrylate (SIMAA)
16. 2-hydroxy-3-methacryloxypropyloxypropyl-tris(trimethylsiloxy)silane
17. mono-(2-hydroxy-3-methacryloxypropyl)-propyl ether terminated mono-n-butyl terminated polydimethylsiloxanes (OH-mPDMS) (containing from 4 to 30, or from 10 to 20, or from 4 to 8 SiO repeat units)

18. 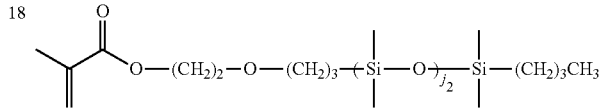

19. 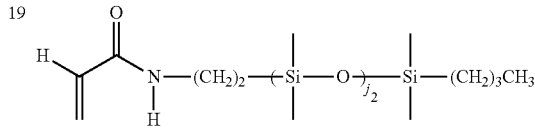

20. 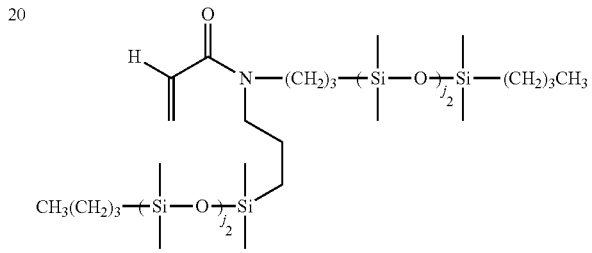

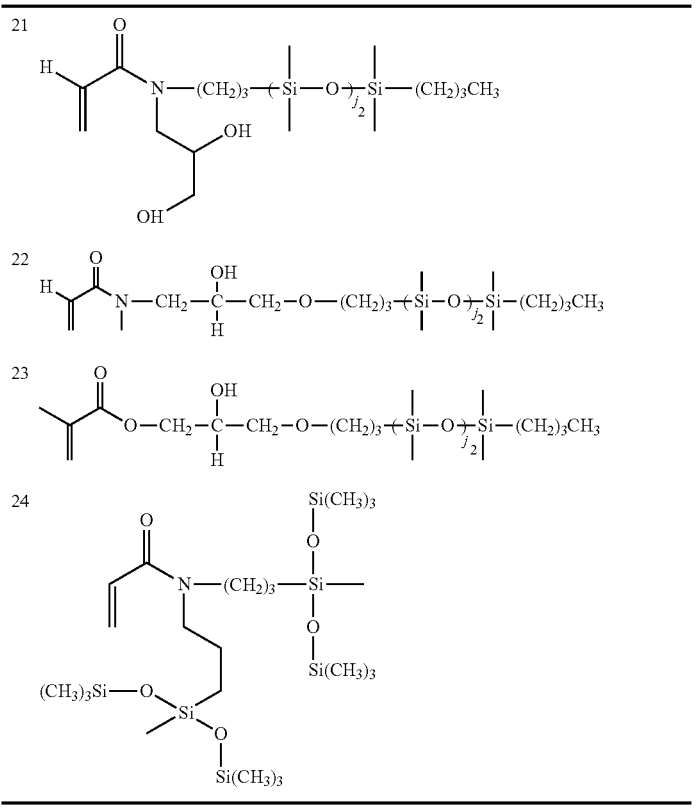

Additional non-limiting examples of suitable silicone-containing components are listed in the table below. Unless otherwise indicated, j2 where applicable is preferably from 1 to 100, more preferably from 3 to 40, or still more preferably from 3 to 15. In compounds containing j1 and j2, the sum of j1 and j2 is preferably from 2 to 100, more preferably from 3 to 40, or still more preferably from 3 to 15.

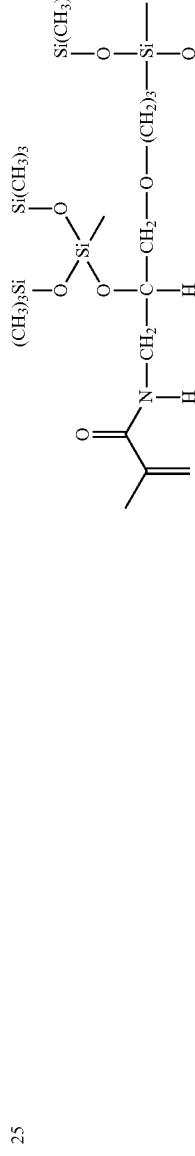
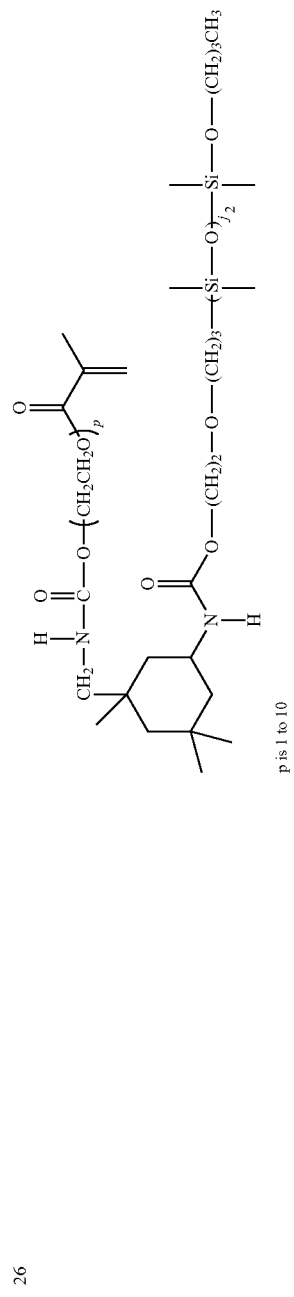
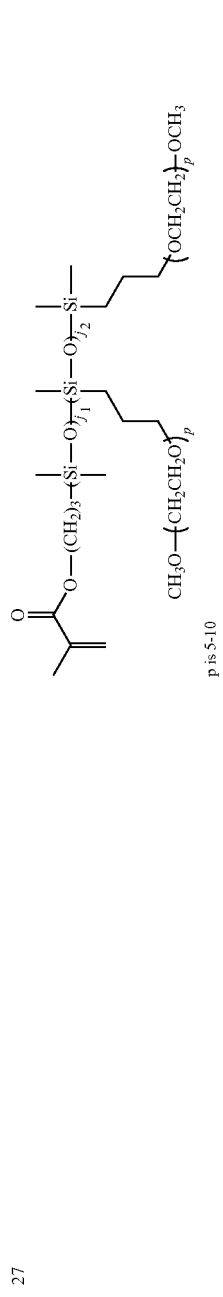

-continued
31 disiloxane
32 3-(vinyloxycarbonylthio) propyl-(trimethylsiloxy)silane
33 3-[tris(trimethylsiloxy)silyl] propyl allyl carbamate
34 3-[tris(trimethylsiloxy)silyl] propyl vinyl carbamate
35 tris(trimethylsiloxy)silylstyrene (Styryl-TRIS)
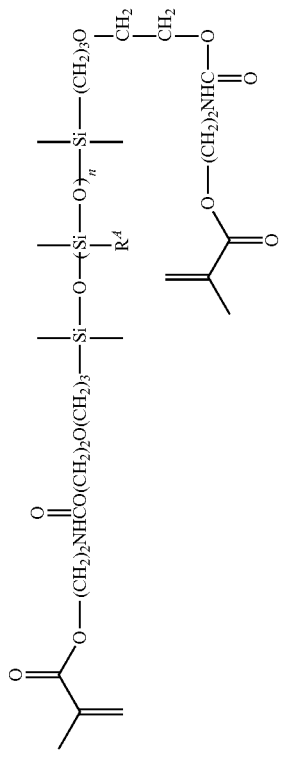
$R^A = CH_2$ (a) or $CH_2CH_2CF_3$ (b) or $CH_2-(CH_2)_2-$
$[OCH_2CH_2]_{1-10}-OCH_3$ (c); a + b + c = n
36
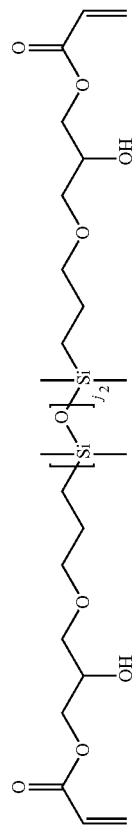
37
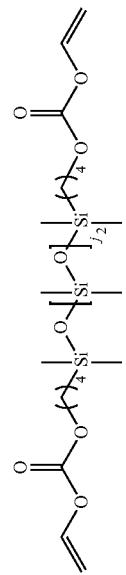
38
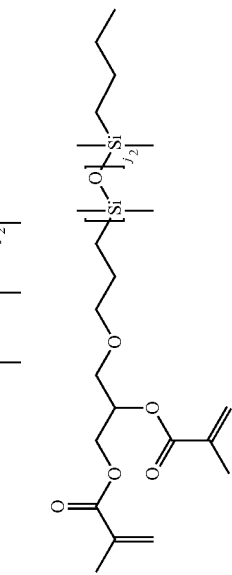
39
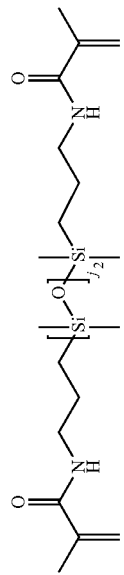

-continued
40
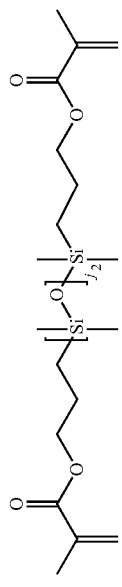
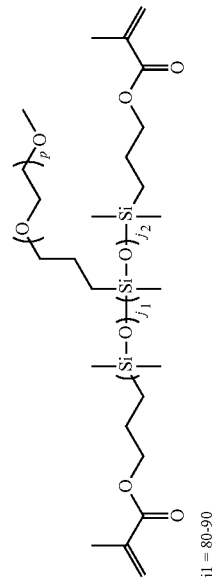
j1 = 80-90
j2 = 5-6
p = 7-8
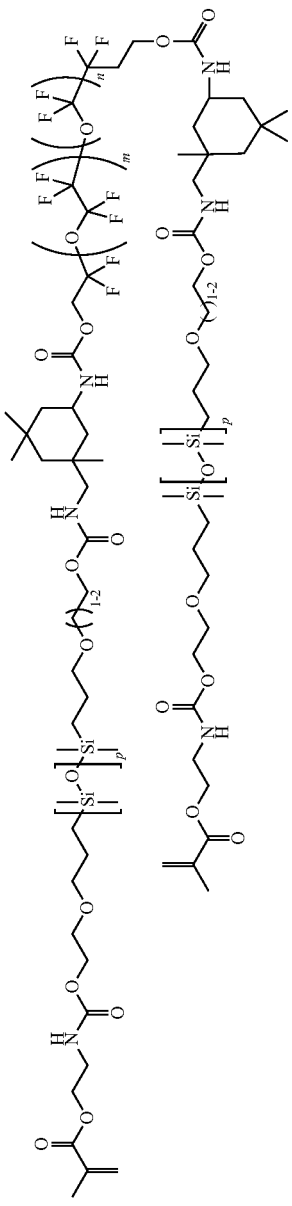
m ≈ 3.5-5.5; n ≈ 4-6.5; p ≈ 22-26
41
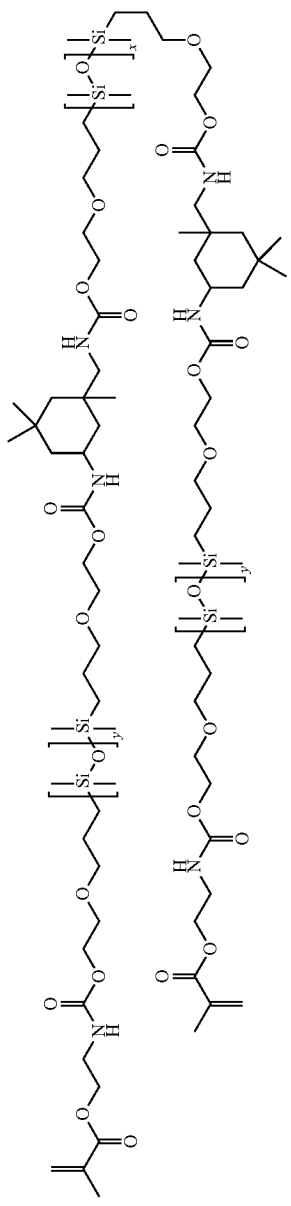
IEM-PMDS(Mn ≈ 3000)-IPDI-PDMS(Mn ≈ 2000)-IPDI-PDMS(Mn ≈ 3000)-IEM (see WO2016100457)

Silicone-containing components may have an average molecular weight of from about 400 to about 4000 daltons.

The silicone containing component(s) may be present in amounts up to about 95 weight %, or from about 10 to about 80 weight %, or from about 20 to about 70 weight %, based upon all reactive components of the reactive mixture (excluding diluents).

Polyamides

The reactive monomer mixture may include at least one polyamide. As used herein, the term "polyamide" refers to polymers and copolymers comprising repeating units containing amide groups. The polyamide may comprise cyclic amide groups, acyclic amide groups and combinations thereof and may be any polyamide known to those of skill in the art. Acyclic polyamides comprise pendant acyclic amide groups and are capable of association with hydroxyl groups. Cyclic polyamides comprise cyclic amide groups and are capable of association with hydroxyl groups.

Examples of suitable acyclic polyamides include polymers and copolymers comprising repeating units of Formulae G1 and G2:

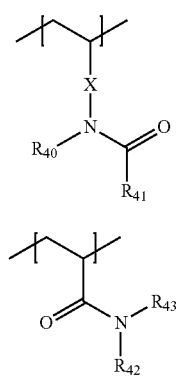

Formula G1

Formula G2 wherein X is a direct bond, —(CO)—, or —(CONHR$_{44}$), wherein R$_{44}$ is a C$_1$ to C$_3$ alkyl group; R$_{40}$ is selected from H, straight or branched, substituted or unsubstituted C$_1$ to C$_4$ alkyl groups, R$_{41}$ is selected from H, straight or branched, substituted or unsubstituted C$_1$ to C$_4$ alkyl groups, amino groups having up to two carbon atoms, amide groups having up to four carbon atoms, and alkoxy groups having up to two carbon groups, R$_{42}$ is selected from H, straight or branched, substituted or unsubstituted C$_1$ to C$_4$ alkyl groups, or methyl, ethoxy, hydroxyethyl, and hydroxymethyl; R$_{43}$ is selected from H, straight or branched, substituted or unsubstituted C$_1$ to C$_4$ alkyl groups; or methyl, ethoxy, hydroxyethyl, and hydroxymethyl; wherein the number of carbon atoms in R$_{40}$ and R$_{41}$ taken together is 8 or less, including 7, 6, 5, 4, 3, or less, and wherein the number of carbon atoms in R$_{42}$ and R$_{43}$ taken together is 8 or less, including 7, 6, 5, 4, 3, or less. The number of carbon atoms in R$_{40}$ and R$_{41}$ taken together may be 6 or less or 4 or less. The number of carbon atoms in R$_{42}$ and R$_{43}$ taken together may be 6 or less. As used herein substituted alkyl groups include alkyl groups substituted with an amine, amide, ether, hydroxyl, carbonyl or carboxy groups or combinations thereof.

R$_{40}$ and R$_{41}$ may be independently selected from H, substituted or unsubstituted C$_1$ to C$_2$ alkyl groups. X may be a direct bond, and R$_{10}$ and R$_{11}$ may be independently selected from H, substituted or unsubstituted C$_1$ to C$_2$ alkyl groups. R$_{42}$ and R$_{43}$ can be independently selected from H, substituted or unsubstituted C$_1$ to C$_2$ alkyl groups, methyl, ethoxy, hydroxyethyl, and hydroxymethyl.

The acyclic polyamides of the present invention may comprise a majority of the repeating units of Formula LV or Formula LVI, or the acyclic polyamides can comprise at least 50 mole percent of the repeating unit of Formula G or Formula G1, including at least 70 mole percent, and at least 80 mole percent. Specific examples of repeating units of Formula G and Formula G1 include repeating units derived from N-vinyl-N-methylacetamide, N-vinylacetamide, N-vinyl-N-methylpropionamide, N-vinyl-N-methyl-2-methylpropionamide, N-vinyl-2-methyl-propionamide, N-vinyl-N,N'-dimethylurea, N,N-dimethylacrylamide, methacrylamide, and acyclic amides of Formulae G2 and G3:

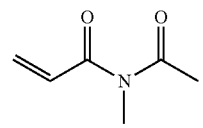

Formula G2

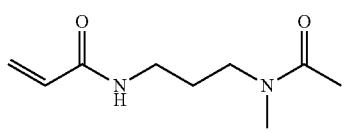

Formula G3

Examples of suitable cyclic amides that can be used to form the cyclic polyamides of include α-lactam, β-lactam, γ-lactam, δ-lactam, and ε-lactam. Examples of suitable cyclic polyamides include polymers and copolymers comprising repeating units of Formula G4:

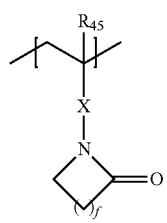

Formula G4 wherein R$_{45}$ is a hydrogen atom or methyl group, wherein f is a number from 1 to 10; wherein X is a direct bond, —(CO)—, or —(CONHR$_{46}$), wherein R$_{46}$ is a C$_1$ to C$_3$ alkyl group. In Formula LIX, f may be 8 or less, including 7, 6, 5, 4, 3, 2, or 1. In Formula G4, f may be 6 or less, including 5, 4, 3, 2, or 1. In Formula G4, f may be from 2 to 8, including 2, 3, 4, 5, 6, 7, or 8. In Formula LIX, f may be 2 or 3. When X is a direct bond, f may be 2. In such instances, the cyclic polyamide may be polyvinylpyrrolidone (PVP).

Cyclic polyamides may comprise 50 mole percent or more of the repeating unit of Formula G4, or the cyclic polyamides can comprise at least 50 mole percent of the repeating unit of Formula G4, including at least 70 mole percent, and at least 80 mole percent.

The polyamides may also be copolymers comprising repeating units of both cyclic and acyclic amides. Additional repeating units may be formed from monomers selected from hydroxyalkyl(meth)acrylates, alkyl(meth)acrylates, other hydrophilic monomers and siloxane substituted (meth)acrylates. Any of the monomers listed as suitable hydrophilic monomers may be used as comonomers to form the additional repeating units. Specific examples of additional monomers which may be used to form polyamides include 2-hydroxyethyl (meth)acrylate, vinyl acetate, acrylonitrile, hydroxypropyl (meth)acrylate, methyl (meth)acrylate and hydroxybutyl (meth)acrylate, dihydroxypropyl (meth)acrylate, polyethylene glycol mono(meth)acrylate, and the like and mixtures thereof. Ionic monomers may also be included. Examples of ionic monomers include (meth)acrylic acid, N-[(ethenyloxy)carbonyl]-β-alanine (VINAL, CAS #148969-96-4), 3-acrylamidopropanoic acid (ACA1), 5-acrylamidopentanoic acid (ACA2), 3-acrylamido-3-methylbutanoic acid (AMBA), 2-(methacryloyloxy)ethyl trimethylammonium chloride (Q Salt or METAC), 2-acrylamido-2-methylpropane sulfonic acid (AMPS), 1-propanaminium, N-(2-carboxyethyl)-N,N-dimethyl-3-[(1-oxo-2-propen-1-yl)amino]-inner salt (CBT), 1-propanaminium, N,N-dimethyl-N-[3-[(1-oxo-2-propen-1-yl)amino]propyl]-3-sulfo-, inner salt (SBT), 3,5-Dioxa-8-aza-4-phosphaundec-10-en-1-aminium, 4-hydroxy-N,N,N-trimethyl-9-oxo-, inner salt, 4-oxide (9CI) (PBT), 2-methacryloyloxyethyl phosphorylcholine, 3-(dimethyl(4-vinylbenzyl)ammonio)propane-1-sulfonate (DMVBAPS), 3-((3-acrylamidopropyl)dimethylammonio)propane-1-sulfonate (AMPDAPS), 3-((3-methacrylamidopropyl)dimethylammonio)propane-1-sulfonate (MAMPDAPS), 3-((3-(acryloyloxy)propyl)dimethylammonio)propane-1-sulfonate (APDAPS), 3-(3-(methacryloyloxy)propyl)dimethylammonio)propane-1-sulfonate (MAPDAPS).

The reactive monomer mixture may comprise both an acyclic polyamide and a cyclic polyamide or copolymers thereof. The acyclic polyamide can be any of those acyclic polyamides described herein or copolymers thereof, and the cyclic polyamide can be any of those cyclic polyamides described herein or copolymers thereof. The polyamide may be selected from the group polyvinylpyrrolidone (PVP), polyvinylmethylacetamide (PVMA), polydimethylacrylamide (PDMA), polyvinylacetamide (PNVA), poly hydroxyethyl (meth)acrylamide, polyacrylamide, and copolymers and mixtures thereof.

The total amount of all polyamides in the reactive mixture may be in the range of between 1 weight percent and about 35 weight percent, including in the range of about 1 weight percent to about 15 weight percent, and in the range of about 5 weight percent to about 15 weight percent, in all cases, based on the total weight of the reactive components of the reactive monomer mixture.

Without intending to be bound by theory, when used with a silicone hydrogel, the polyamide functions as an internal wetting agent. The polyamides may be non-polymerizable, and in this case, are incorporated into the silicone hydrogels as semi-interpenetrating networks. The polyamides are entrapped or physically retained within the silicone hydrogels. Alternatively, the polyamides may be polymerizable, for example as polyamide macromers or prepolymers, and in this case, are covalently incorporated into the silicone hydrogels. Mixtures of polymerizable and non-polymerizable polyamides may also be used.

When the polyamides are incorporated into the reactive monomer mixture they may have a weight average molecular weight of at least 100,000 daltons, greater than about 150,000; between about 150,000 to about 2,000,000 daltons; between about 300,000 to about 1,800,000 daltons. Higher molecular weight polyamides may be used if they are compatible with the reactive monomer mixture.

When the compositions described herein are used in silicone hydrogel contact lenses, the lens may preferably exhibit the following properties. All values are prefaced by "about," and the lens may have any combination of the listed properties. The properties may be determined by methods known to those skilled in the art, for instance as described in United States pre-grant publication US20180037690, which is incorporated herein by reference.

Water content weight %: at least 20%, at least 25%, at least about 30%, or at least about 35%, and up to 80% or up to 70%

Haze: 30% or less, or 10% or less

Advancing dynamic contact angle (Wilhelmy plate method): 100° or less, or 80° or less; or 50° or less Tensile Modulus (psi): 120 or less, or 80 to 120

Oxygen permeability (Dk, barrers): at least 80, or at least 100, or at least 150, or at least 200

Elongation to Break: at least 100

For ionic silicon hydrogels, the following properties may also be preferred (in addition to those recited above):

Lysozyme uptake (μg/lens): at least 100, or at least 150, or at least 500, or at least 700

Polyquaternium 1 (PQ1) uptake (%): 15 or less, or 10 or less, or 5 or less

EXAMPLES

The present disclosure comprises at least the following examples. The examples below are intended to further illustrate certain aspects of the materials and methods described herein, and is not intended to limit the scope of the claims.

Aspect 1: A composition for light filtering, the composition comprising, a base material; a plurality of gold nanoparticles dispersed in the base material, wherein the plurality of gold nanoparticles exhibit a peak light absorption value in the range of about 500 nm to about 600 nm with a Full Width at Half Maximum (FWHM) of about 30 nm to about 100 nm; an anchoring mechanism dispersed in the base material, the anchoring mechanism comprising methacryloyl-derived monomer; and a nanoparticle coating material disposed on at least a portion of the plurality of gold nanoparticles.

Aspect 2: The composition of aspect 1, wherein the base material comprises a biomaterial.

Aspect 3: The composition of aspect 1, wherein the base material comprises a biomaterial matrix.

Aspect 4: The composition of aspect 1, wherein the base material comprises hydrogel.

Aspect 5: The composition of aspect 1, wherein the base material comprises silicone-based hydrogel.

Aspect 6: The composition of aspect 1, wherein the base material comprises a HEMA-based material.

Aspect 7: The composition any one of aspects 1-6, wherein at least a portion of the plurality of gold nanoparticles comprise a sphere shape, a rod shape, a bipyramid shape, or a star shape.

Aspect 8: The composition any one of aspects 1-7, wherein one or more of a size or a shape of at least a portion of the plurality of gold nanoparticles is tuned such that the portion of the plurality of gold nanoparticles exhibits a peak light absorption in the range of about 500 nm to about 600 nm.

Aspect 9: The composition any one of aspects 1-8, wherein at least a portion of the plurality of gold nanoparticles comprise a size of about 1 nm to about 99 nm.

Aspect 10: The composition any one of aspects 1-9, wherein the anchoring mechanism comprises glycidyl methacrylate.

Aspect 11: The composition any one of aspects 1-10, wherein the nanoparticle coating material comprises poly (vinyl alcohol).

Aspect 12: A composition for light filtering, the composition comprising: a base material comprising a HEMA-based material; a plurality of metal nanoparticles dispersed in the base material, wherein the plurality of metal nanoparticles exhibit a peak light absorption value in the range of about 500 nm to about 600 nm; an anchoring mechanism dispersed in the base material, the anchoring mechanism comprising methacryloyl-derived monomer; and a nanoparticle coating material disposed on at least a portion of the plurality of metal nanoparticles.

Aspect 13: The composition of aspect 12, wherein at least a portion of the plurality of metal nanoparticles comprise a sphere shape, a rod shape, a bipyramid shape, or a star shape.

Aspect 14: The composition of any one of aspects 12-13, wherein at least a portion of the plurality of metal nanoparticles exhibit a Full Width at Half Maximum (FWHM) of about 30 nm to about 100 nm.

Aspect 15: The composition of any one of aspects 12-14, wherein one or more of a size or a shape of at least a portion of the plurality of metal nanoparticles is tuned such that the portion of the plurality of metal nanoparticles exhibits a peak light absorption in the range of about 500 nm to about 600 nm.

Aspect 16: The composition of any one of aspects 12-15, wherein at least a portion of the plurality of metal nanoparticles comprise a size of about 1 nm to about 99 nm.

Aspect 17: The composition of any one of aspects 12-16, wherein the anchoring mechanism comprises glycidyl methacrylate.

Aspect 18: The composition of any one of aspects 12-17, wherein the nanoparticle coating material comprises poly (vinyl alcohol).

Aspect 19: A composition for light filtering, the composition comprising: a base material comprising a HEMA-based material, a plurality of plasmonic nanoparticles dispersed in the base material, wherein the plurality of plasmonic nanoparticles exhibit a peak light absorption value in the range of about 500 nm to about 600 nm; an anchoring mechanism dispersed in the base material, the anchoring mechanism comprising methacryloyl-derived monomer; and a nanoparticle coating material disposed on at least a portion of the plurality of plasmonic nanoparticles.

Aspect 20: The composition of aspect 19, wherein at least a portion of the plurality of plasmonic nanoparticles comprise a sphere shape, a rod shape, a bipyramid shape, a star shape, a decahedron shape, a cuboctahedron shape, or a cube shape.

Aspect 21: The composition of any one of aspects 19-20, wherein at least a portion of the plurality of plasmonic nanoparticles exhibit a Full Width at Half Maximum (FWHM) of about 30 nm to about 100 nm.

Aspect 22: The composition of any one of aspects 19-21, wherein one or more of a size or a shape of at least a portion of the plurality of plasmonic nanoparticles is tuned such that the portion of the plurality of plasmonic nanoparticles exhibits a peak light absorption in the range of about 500 nm to about 600 nm.

Aspect 23: The composition of any one of aspects 19-22, wherein at least a portion of the plurality of plasmonic nanoparticles comprise a size of about 1 nm to about 99 nm.

Aspect 24: The composition of any one of aspects 19-23, wherein the anchoring mechanism comprises glycidyl methacrylate.

Aspect 25: The composition of any one of aspects 19-24, wherein the nanoparticle coating material comprises poly (vinyl alcohol).

As an illustrative example, FIGS. 1-4 show how light filtering in the region between the red and green cones can help improve contrast and color perception for people with red-green colorblindness (FIG. 1). A platform was developed using gold nanoparticles to selectively block light in the target range. The platform leveraged the localized surface plasmon resonance (LSPR) peak of spherical gold nanoparticles (AuNPs) to tailor the light filtering profile.

Figure 3:
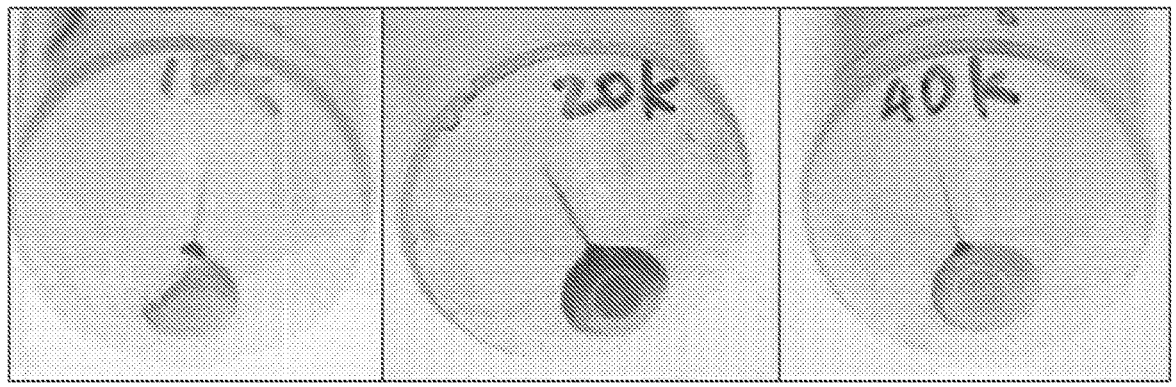
FIG. 3 depicts methacrylated poly(vinyl alcohol)-nanoparticles (PVA-NPs) after centrifugation.

FIG. 1 is a schematic illustration of an example surface modification strategy. FIG. 1 illustrates the method of artificially blocking the area between the red and green cones to improve contrast for people with red-green color vision deficiency. The most significant hurdle that had to be overcome in devising the surface modification strategy was maintaining the colloidal stability of methacrylated polyvinyl alcohol-nanospheres (PVA-NSs) in water. Since methacrylation increased the hydrophobicity of the NS surface, NSs become more likely to aggregate in polar solvents like water. Polyvinyl alcohol-nanoparticles (PVA-NPs) of increasing PVA molecular weight (10 kDa, 80% hydrolyzed; 20 kDa and 40 kDa, both >98% hydrolyzed) were methacrylated in dimethylsulfoxide (DMSO) with 3.77 µl glycidyl methacrylate (GMA) and centrifuged at 12,000×g for 15 min. After resuspension in MilliQ water, centrifugation was performed and all samples aggregated. Dark spots and tails at the bottom of each tube of aggregated NPs were observed, and sonication was unsuccessful in resuspending NPs (FIG. 3).

Figure 4:
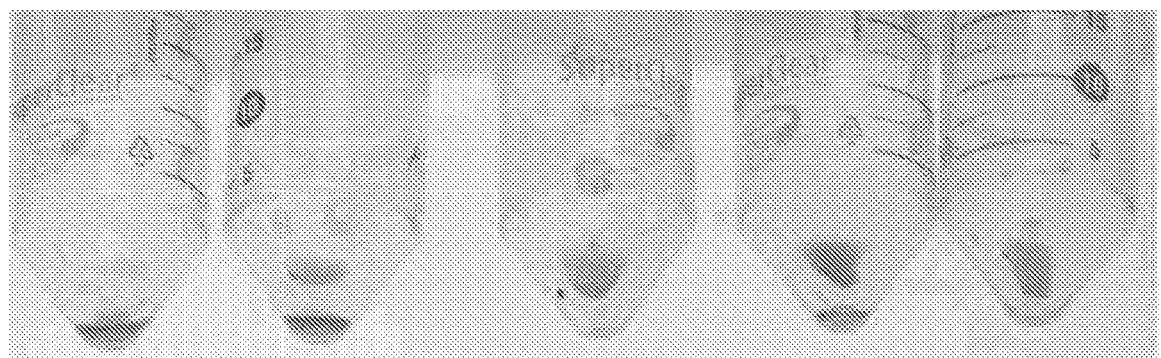
FIG. 4 displays the effect of hydrophilic-lipophilic balance (HLB) values on the stability of methacrylated poly(vinyl alcohol)-nanospheres (PVA-NSs).

An attempt to mitigate aggregation was devised using surfactants, which were amphiphilic and could potentially help passivate the surface of the PVA-NSs to prevent aggregation. One parameter investigated was the hydrophilic-lipophilic balance (HLB), a common tool used to assess the relative solubility of a given surfactant in water versus oil. The HLB scales from 0 (completely hydrophobic) to 18 (completely hydrophilic) (Hakemi-Vala, M., et al., Nano-Microscale Drug Deliv. Syst. Des. Fabr (2017). Matching the HLB of the surfactant with that of an emulsion minimizes the interfacial surface tension, improving their stability and decreasing coalescence. Although the PVA-NS solutions were not emulsions, it was believed that this phenomenon could be used for methacrylated PVA-NSs to produce similar results and improve aqueous stability. Using two common surfactants, cetyltrimethylammonium bromide (CTAB, 4 mM, HLB: 10) and Tween 20 (4 mM, HLB: 17), surfactant mixtures were produced with effective HLB values of 10, 11.75, 13.5, 15.25 and 17 and tested for their effect on nanoparticle stability after centrifugation (FIG. 4). There was no significant observed difference between the HLB values: all samples aggregated in water after centrifugation.

Since the efficacy of the surfactants on stabilizing the NPs in solution may depend on interactions with the NS surface (including with PVA and the methacrylate group) or other factors beyond HLB values, the selection of surfactants was expanded to include Tetronic (24 mM, HLB 15) and Pluronic F-127 (90 mM, HLB 18-24) to attempt to further improve stability. Pluronic F-127 improved the post-centrifugation recovery of the methacrylated PVA-NSs the most but required high concentrations (>200 mM) to achieve an acceptable recovery post-centrifugation. Having not seen sufficient improvement by varying surfactants, other factors were considered.

Figure 5:
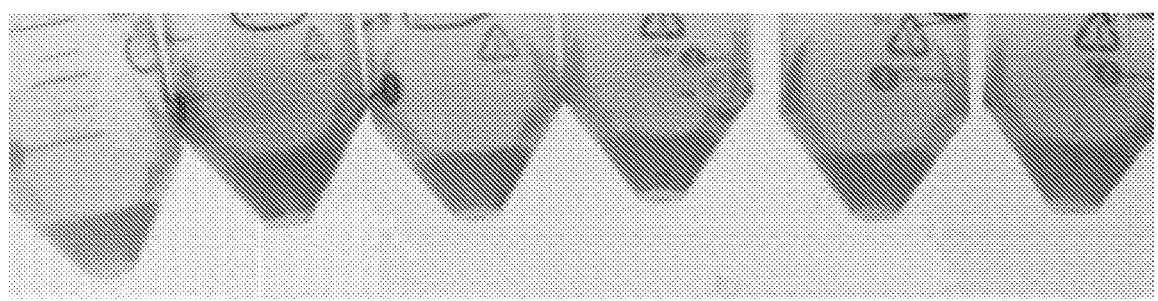
FIG. 5 displays the effect of polyvinylpyrrolidone (PVP) addition on stability of methacrylated poly(vinyl alcohol)-nanospheres (PVA-NSs).

Small amounts of 55 kDa PVP were added to the PVA-NS surface (I mM or 0.1114 mg/ml PVP, compared to 4 mM or 2 mg/ml PVA) to increase hydrophilicity and stabilize the PVA-NSs. This system was tested in addition to the use of surfactant Pluronic F-127 (90 mM) to determine if the PVA-NSs could be stabilized at different degrees of methacrylation (FIG. 5).

PVA-NSs were methacrylated with increasing amounts of glycidyl methacrylate (GMA) and either resuspended in MilliQ water or a solution of 90 mM Pluronic F-127 post-methacrylation according to Table 1 below. All PVA-NSs showed some discoloration and aggregation after methacrylation but lower amounts of GMA and inclusion of Pluronic F-127 combined to improve recovery.

TABLE 1

Effect of PVP addition on stability of methacrylated PVA-NSs

| Sample | a | b | c | d | e | f |
|---|---|---|---|---|---|---|
| GMA (µl) | 0.94 | | 1.88 | | 3.76 | |
| Pluronic F-127 (90 mM) | − (MilliQ water) | + | − (MilliQ water) | + | − (MilliQ water) | + |

Figures 6A, 6B:
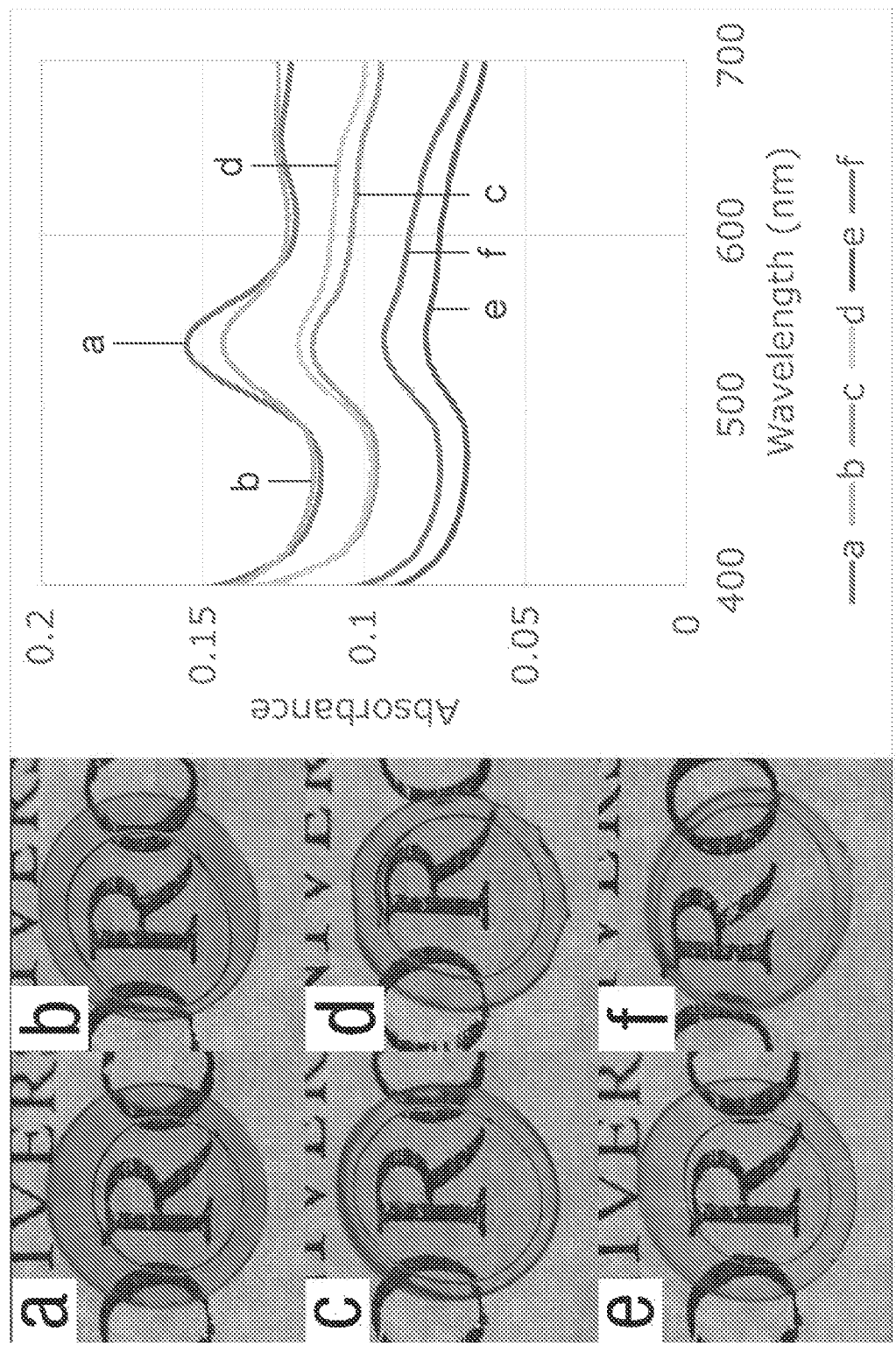
FIGS. 6A-6B display methacrylated poly(vinyl alcohol)-nanospheres PVA-NSs embedded in Etafilcon A contact lenses (FIG. 6A) and resultant absorbance spectra (FIG. 6B).

Samples a and b, according to Table 1, were integrated into contact lenses to determine whether color and stability could be sustained in the Etafilcon A lens matrix (FIGS. 6A-6B). Both samples a and b produced tinted lenses (FIG. 5A) (in agreement with the UV-Vis spectra shown in FIG. 6B), showing improved recovery in the presence of PVP. Compared to the stability afforded by PVP, the presence of Pluronic F-127 in the suspension did not significantly improve stability of the methacrylated PVA-NSs.

Figure 2:
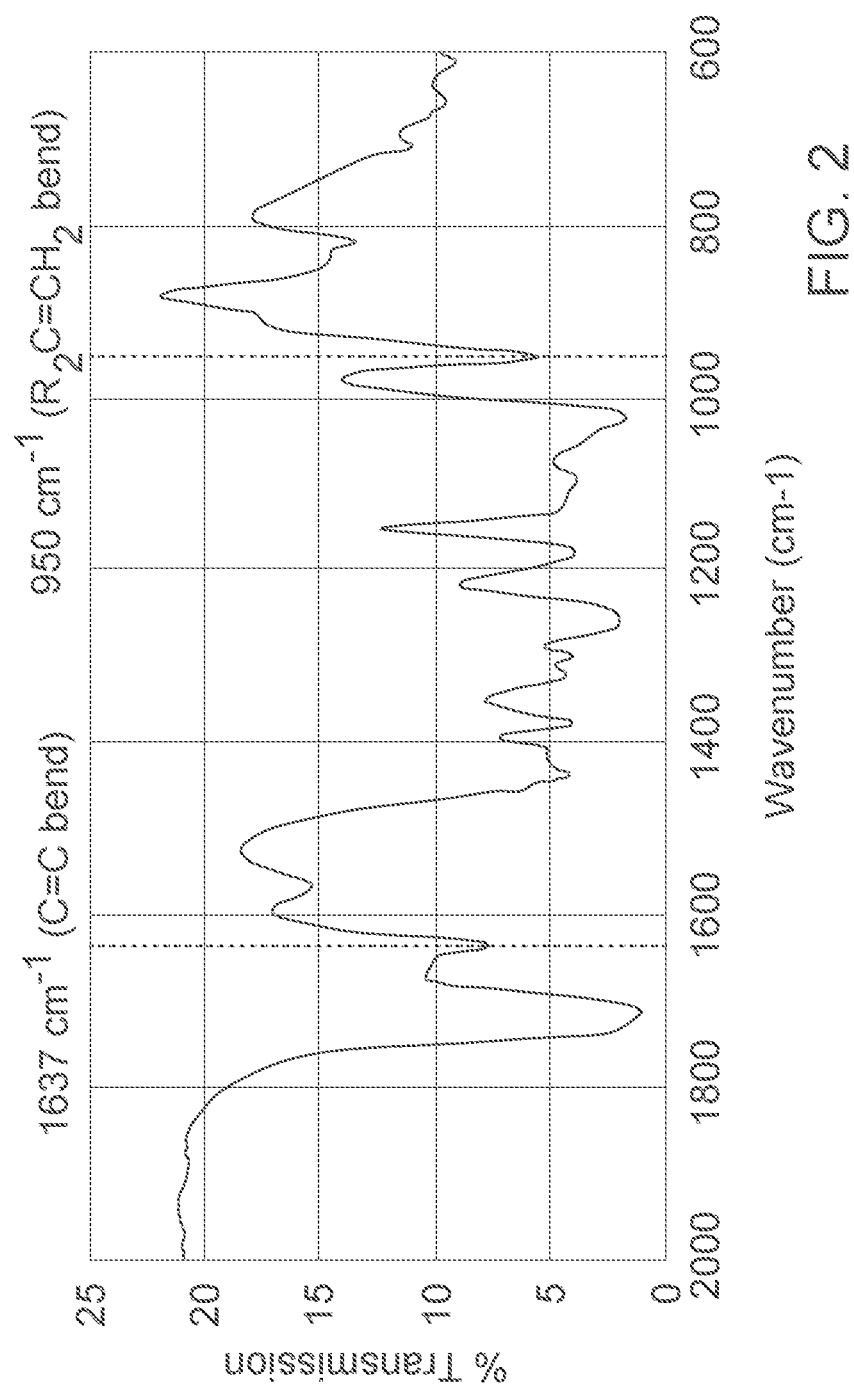
FIG. 2 depicts a Fourier-Transform Infrared (FTIR) spectrum of PVA conjugated with glycidyl methacrylate (MA) according to embodiments of the disclosure.

Considering the above, the surface chemistry of the gold nanoparticles (AuNPs) was designed to be chemically and physically lens-compatible and to be capable of covalent integration with the monomer mixture. For Etafilcon lenses, the primary monomer was 2-hydroxyethyl methacrylate (HEMA), a methacrylate compound with a double bonded carbon for radical polymerization. The AuNPs were thus coated with poly(vinyl alcohol) (PVA) and methacrylated with glycidyl methacrylate using transesterification, as can be seen in FIG. 2. In a 20-ml scintillation vial, 45 mM PVA (10 kDa, 8 ml) and nanospheres (NSs) (8 ml) were combined to produce PVA-NSs. Small amounts of 55 kDa polyvinylpyrrolidone PVP (~2 mol % compared to PVA) were added to improve stability and hydrophilicity of PVA-NSs. The samples were left undisturbed in the fume hood overnight and used beginning the next day. PVA-NSs were centrifuged at 12,000×g for 15 min twice and resuspended in 5 ml dimethylsulfoxide (DMSO) both times. In a 20-ml scintillation vial, PVA-NSs (5 ml), glycidyl methacrylate (GMA) (0.94 µl), and tetramethylethylenediamine (TEMED) (3.39 µl) were added sequentially and stirred at 1000 rpm for 6 hrs at 60° C. Vials were protected from light using aluminum foil to avoid polymerization of GMA. After the reaction completed, the methacrylated PVA-NSs were centrifuged at 12,000×g for 15 min twice and resuspended in 5 ml and 0.25 ml MilliQ water, respectively, via sonication.

All infrared (IR) measurements were done with a Nicolet iS50 Fourier Transform Infrared (FTIR) with attenuated total reflection (ATR) accessory from Thermo Scientific. The data was collected with the OMNIC software. The wavelength range collected was from 4000 to 400 cm 1 (step size: 0.17 cm*) and 16 scans per sample. FTIR spectra were compared against literature to identify peaks.

Figure 7A:
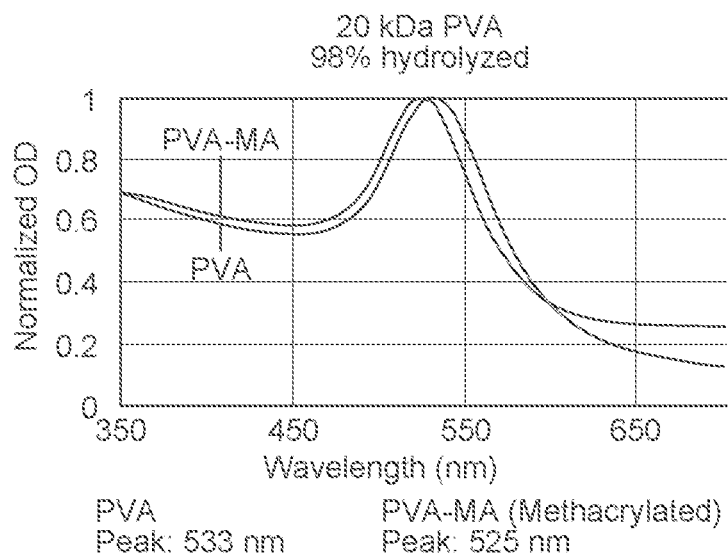
FIGS. 7A-7B depict an effect of methacrylation on light filtering spectrum in solution according to embodiments of the disclosure.
Figure 7B:
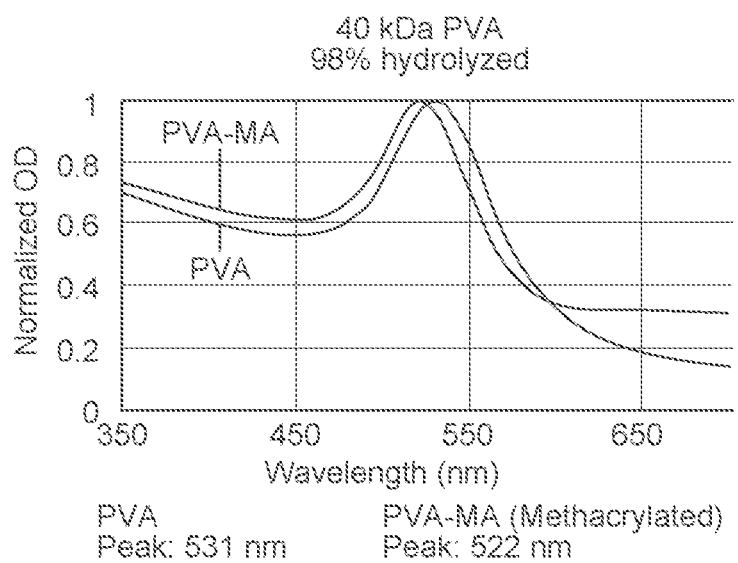

Methacrylated AuNPs retained colloidal stability with minor blue-shifts in their light filtering spectra, as can be seen in FIGS. 7A-7B, displaying effects of methacrylation on light filtering spectrum in solution. Different molecular weights and degrees of hydrolysis of PVA were selected. Nanoparticles were coated with 20 kDa (FIG. 7A) or 40 kDa (FIG. 7B) PVA and either methacrylated or not. The methacrylated AuNPs were then mixed with the Etafilcon monomer mixture and cured under blue light to produce contact lenses. The Ultraviolet-Visible (UV-Vis) spectra show that the LSPR was maintained in the contact lens for all samples, as can be seen in the graph of FIG. 8A. The images of FIG. 8B demonstrate that the AuNPs were homogeneously dispersed within the lenses with a consistent profile along the entire material. Peaks were red-shifted as compared to suspensions in solution, and nearly identical to the original spectrum before methacrylation.

Figure 1B:
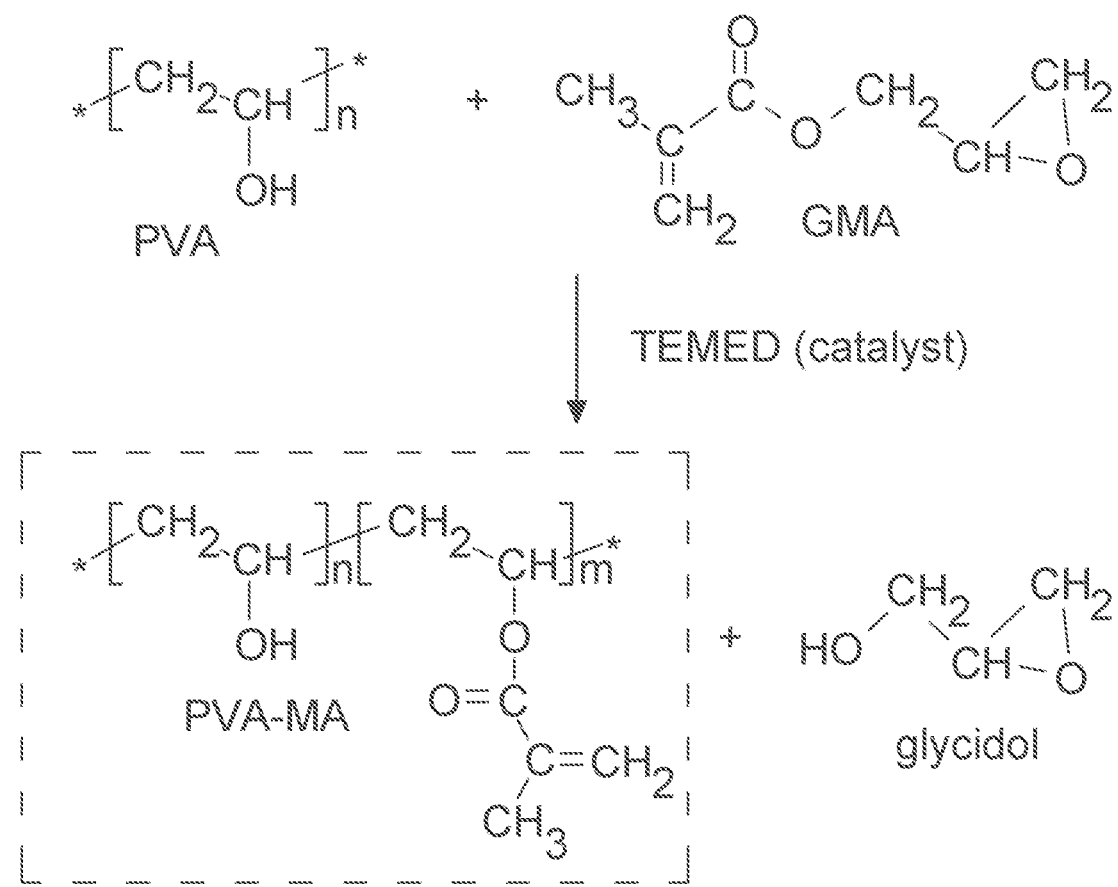
Figure 9:
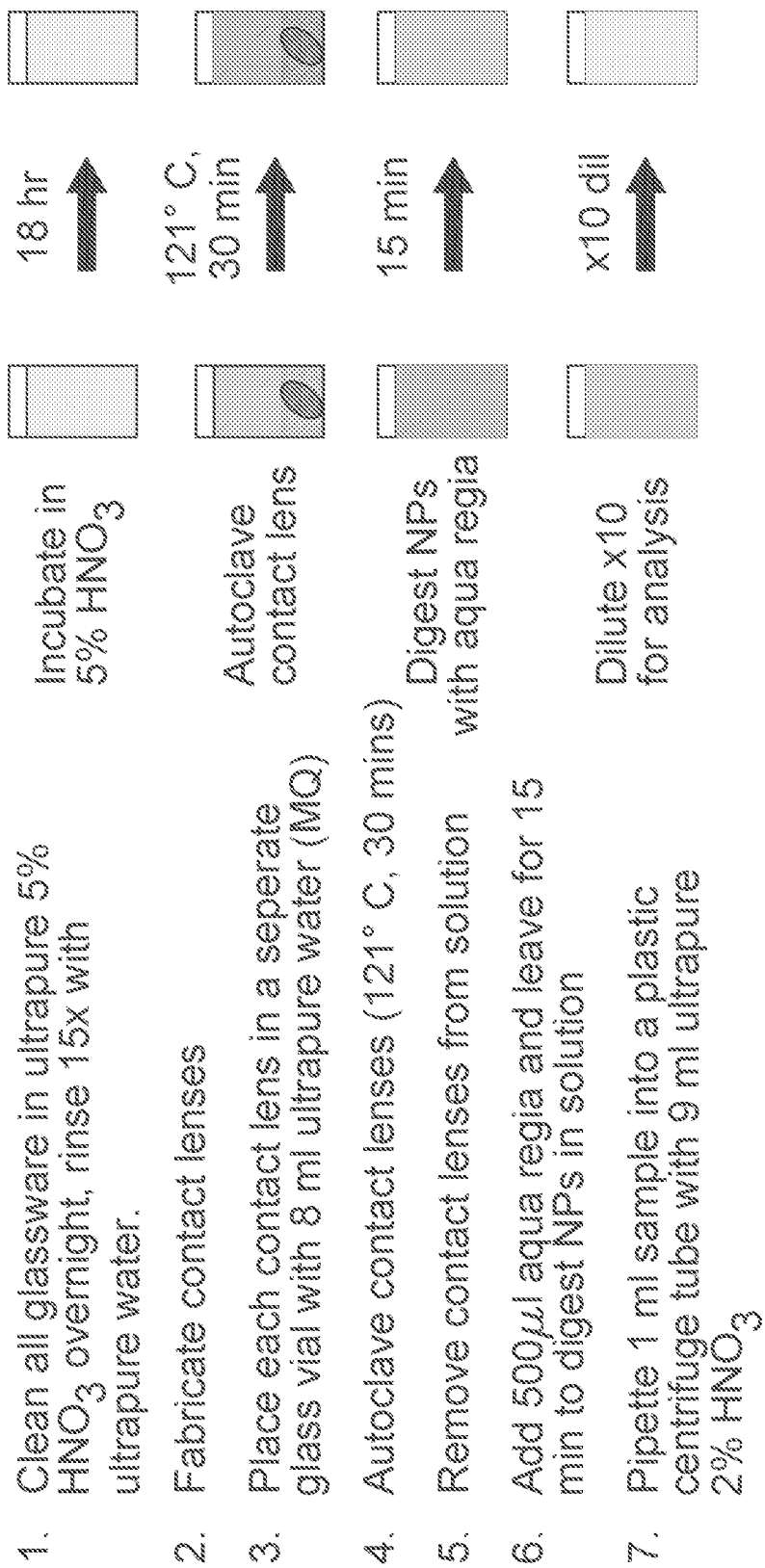
FIG. 9 depicts sample preparation for inductively coupled plasma-mass spectrometry (ICP-MS) measurements according to embodiments of the disclosure.

The materials of the current disclosure were autoclave stable, as is important for contact lens commercialization. Retention of the NPs was determined by measuring the level of Au leaching from the lenses after autoclaving, as shown in FIG. 9. FIG. 9 further illustrates sample preparation for ICP-MS measurements. The resultant lenses had less than about 100 ppb (0.1 ppm) Au in solution, translating to less than about 1 µg total Au being released per lens, as can be seen in Table 1 below. FIG. 1B illustrates an example methacrylation of PVA through a reaction pathway (adapted from Crispim, et al., e-Polymers, 2006) and a Fourier-Transform Infrared (FTIR) spectrum of poly(vinyl alcohol) (PVA) conjugated with glycidyl methacrylate (GMA) (FIG. 2).

Table 1 below, shows Au leaching from contact lenses. NP-laden contact lenses were autoclaved and assessed for Au leaching to determine retention of the Au nanoparticles.

| PVA MW (kDa) | Au (ppb) | Au (µg) |
|---|---|---|
| 10 | 51 | 0.41 |
| 20 | 94 | 0.75 |
| 40 | 83 | 0.67 |

The systems, methods, compositions, and devices of the appended claims are not limited in scope by the specific materials and devices described herein, which are intended as illustrations of a few aspects of the claims. Any systems, methods, compositions, and devices that are functionally equivalent are intended to fall within the scope of the claims. Various modifications of the systems, methods, compositions, and devices in addition to those shown and described herein are intended to fall within the scope of the appended claims. Further, while only certain representative systems, methods, compositions, and devices disclosed herein are specifically described, other combinations of the systems, methods, compositions, and devices are also are intended to fall within the scope of the appended claims, even if not specifically recited. Thus, a combination of elements, components, or constituents may be explicitly mentioned herein or less, however, other combinations of elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A composition for light filtering, the composition comprising:
   a base material;
   a plurality of gold nanoparticles dispersed in the base material, wherein the plurality of gold nanoparticles exhibit a peak light absorption value in the range of about 500 nm to about 600 nm with a Full Width at Half Maximum (FWHM) of about 90 nm to about 100 nm;
   an anchoring mechanism dispersed in the base material, the anchoring mechanism comprises glycidyl methacrylate; and
   a nanoparticle coating material disposed on at least a portion of the plurality of gold nanoparticles.

2. The composition of claim 1, wherein the base material comprises a biomaterial.

3. The composition of claim 1, wherein the base material comprises a biomaterial matrix.

4. The composition of claim 1, wherein the base material comprises hydrogel.

5. The composition of claim 1, wherein the base material comprises silicone-based hydrogel.

6. The composition of claim 1, wherein the base material comprises a HEMA-based material.

7. The composition of claim 1, wherein at least a portion of the plurality of gold nanoparticles comprise a sphere shape, a rod shape, a bipyramid shape, or a star shape.

8. The composition of claim 1, wherein one or more of a size or a shape of at least a portion of the plurality of gold nanoparticles is tuned such that the portion of the plurality of gold nanoparticles exhibits a peak light absorption in the range of about 500 nm to about 600 nm.

9. The composition of claim 1, wherein at least a portion of the plurality of gold nanoparticles comprise a size of about 1 nm to about 99 nm.

10. The composition of claim 1, wherein the nanoparticle coating material comprises poly(vinyl alcohol).

11. A composition for light filtering, the composition comprising:
    a base material comprising a HEMA-based material;
    a plurality of metal nanoparticles dispersed in the base material, wherein the plurality of metal nanoparticles exhibit a peak light absorption value in the range of about 500 nm to about 600 nm and wherein at least a portion of the plurality of metal nanoparticles exhibit a Full Width at Half Maximum (FWHM) of about 90 nm to about 100 nm;
    an anchoring mechanism dispersed in the base material, the anchoring mechanism comprises glycidyl methacrylate; and
    a nanoparticle coating material disposed on at least a portion of the plurality of metal nanoparticles.

12. The composition of claim 11, wherein at least a portion of the plurality of metal nanoparticles comprise a sphere shape, a rod shape, a bipyramid shape, or a star shape.

13. The composition of claim 11, wherein one or more of a size or a shape of at least a portion of the plurality of metal nanoparticles is tuned such that the portion of the plurality of metal nanoparticles exhibits a peak light absorption in the range of about 500 nm to about 600 nm.

14. The composition of claim 11, wherein at least a portion of the plurality of metal nanoparticles comprise a size of about 1 nm to about 99 nm.

15. The composition of claim 11, wherein the nanoparticle coating material comprises poly(vinyl alcohol).

16. A composition for light filtering, the composition comprising:
    a base material comprising a HEMA-based material;
    a plurality of plasmonic nanoparticles dispersed in the base material, wherein the plurality of plasmonic nanoparticles exhibit a peak light absorption value in the range of about 500 nm to about 600 nm and wherein at least a portion of the plurality of plasmonic nanoparticles exhibit a Full Width at Half Maximum (FWHM) of about 90 nm to about 100 nm;
    an anchoring mechanism dispersed in the base material, the anchoring mechanism comprises glycidyl methacrylate; and
    a nanoparticle coating material disposed on at least a portion of the plurality of plasmonic nanoparticles.

17. The composition of claim 16, wherein at least a portion of the plurality of plasmonic nanoparticles comprise a sphere shape, a rod shape, a bipyramid shape, a star shape, a decahedron shape, a cuboctahedron shape, or a cube shape.

18. The composition of claim 16, wherein one or more of a size or a shape of at least a portion of the plurality of plasmonic nanoparticles is tuned such that the portion of the plurality of plasmonic nanoparticles exhibits a peak light absorption in the range of about 500 nm to about 600 nm.

19. The composition of claim 16, wherein at least a portion of the plurality of plasmonic nanoparticles comprise a size of about 1 nm to about 99 nm.

20. The composition of claim 16, wherein the nanoparticle coating material comprises poly(vinyl alcohol).

21. A contact lens comprising a composition for light filtering, wherein the composition exhibits a peak light absorption value in the range of about 500 nm to about 600 nm, the peak having a Full Width at Half Maximum (FWHM) of about 90 nm to about 100 nm, and wherein the contact lens comprises a HEMA-based material, and wherein the composition comprises a plurality of plasmonic nanoparticles and an anchoring mechanism dispersed in the contact lens, the anchoring mechanism comprises glycidyl methacrylate; and a nanoparticle coating material disposed on at least a portion of the plurality of plasmonic nanoparticles.

22. The contact lens of claim 21, wherein at least a portion of the plurality of plasmonic nanoparticles comprise a sphere shape, a rod shape, a bipyramid shape, a star shape, a decahedron shape, a cuboctahedron shape, or a cube shape.

23. The contact lens of claim 21, wherein one or more of a size or a shape of at least a portion of the plurality of plasmonic nanoparticles is tuned such that the portion of the plurality of plasmonic nanoparticles exhibits a peak light absorption in the range of about 500 nm to about 600 nm.

24. The contact lens of claim 21, wherein at least a portion of the plurality of plasmonic nanoparticles comprise a size of about 1 nm to about 99 nm.

25. The contact lens of claim 21, wherein the nanoparticle coating material comprises poly(vinyl alcohol).

\* \* \* \* \*